(12) United States Patent
Brown et al.

(10) Patent No.: US 6,901,381 B2
(45) Date of Patent: May 31, 2005

(54) METHOD FOR ROLLING SALABLE INVENTORY CONTROL AND SYSTEM THEREFOR

(75) Inventors: Michael James Brown, Washington, DC (US); William J. Lerch, Bear, DE (US)

(73) Assignee: National Railroad Passenger Corporation, Washington, DC (US)

( * ) Notice: Subject to any disclaimer, the term of this patent is extended or adjusted under 35 U.S.C. 154(b) by 675 days.

(21) Appl. No.: 09/769,291

(22) Filed: Jan. 26, 2001

(65) Prior Publication Data

US 2003/0191698 A1 Oct. 9, 2003

(51) Int. Cl.[7] .............................................. G06F 17/60
(52) U.S. Cl. ........................ 705/28; 705/22; 235/385
(58) Field of Search ............................. 705/21, 28, 22, 705/15; 701/201; 235/384, 385

(56) References Cited

U.S. PATENT DOCUMENTS

| | | | | |
|---|---|---|---|---|
| 5,202,825 A | * | 4/1993 | Miller et al. ................... | 705/22 |
| 5,796,832 A | * | 8/1998 | Kawan ......................... | 235/380 |
| 6,006,100 A | * | 12/1999 | Koenck et al. ............... | 235/472 |
| 6,351,689 B1 | * | 2/2002 | Carr et al. .................... | 235/381 |
| 6,370,515 B1 | * | 4/2002 | Diamond et al. ............. | 705/22 |
| 6,442,448 B1 | * | 8/2002 | Finley et al. ................. | 235/381 |
| 6,546,425 B1 | * | 4/2003 | Hanson et al. ............... | 709/227 |

FOREIGN PATENT DOCUMENTS

GB     2 205 428 A1   *   12/1988

OTHER PUBLICATIONS

Shand, Dawne, "Fulfilling the Promise of E–Business" Knowledge Management, Aug. 2000, p26(6).*

* cited by examiner

*Primary Examiner*—Lynda Jasmin
(74) *Attorney, Agent, or Firm*—Louis Woo

(57) ABSTRACT

To keep tab of a rolling or moving inventory loaded onto a moving transport such as for example a train, a number of upload/download workstations are dispersed among the various train stations of the transport network. Each of the workstations is communicatively connected to a centrally located host server. A portable terminal in the form of a point of sale (POS) unit is provided to each service agent assigned to one of the trains that travels a given route along the network. The POS unit is connected to a workstation at the commissary where inventory is removed for stocking the train to download data relating to the amount of inventory removed from the commissary. During the trip, the POS unit is used as a cash register as well as a recorder of all transactions that take place. At the end of the trip, the POS unit is removed from the train and connected to an upload/download workstation located at the destination train station. Data relating to the unused inventory is uploaded to the workstation and from there to the management of the network. The data may include information relating to the amount of inventory used, the amount of sales and the monies and credit card amounts received.

23 Claims, 18 Drawing Sheets

Food & Beverage System Commissary LAN Environment

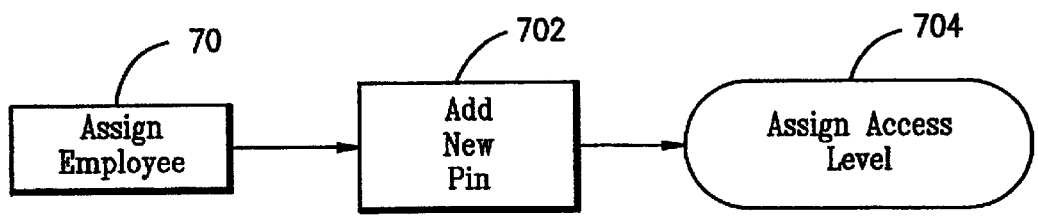
FIG. 8
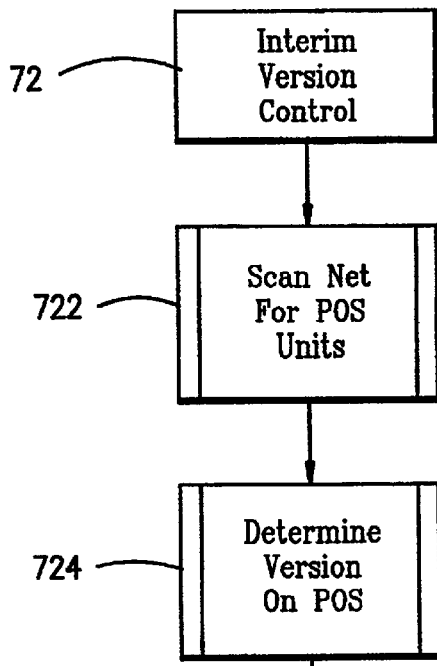
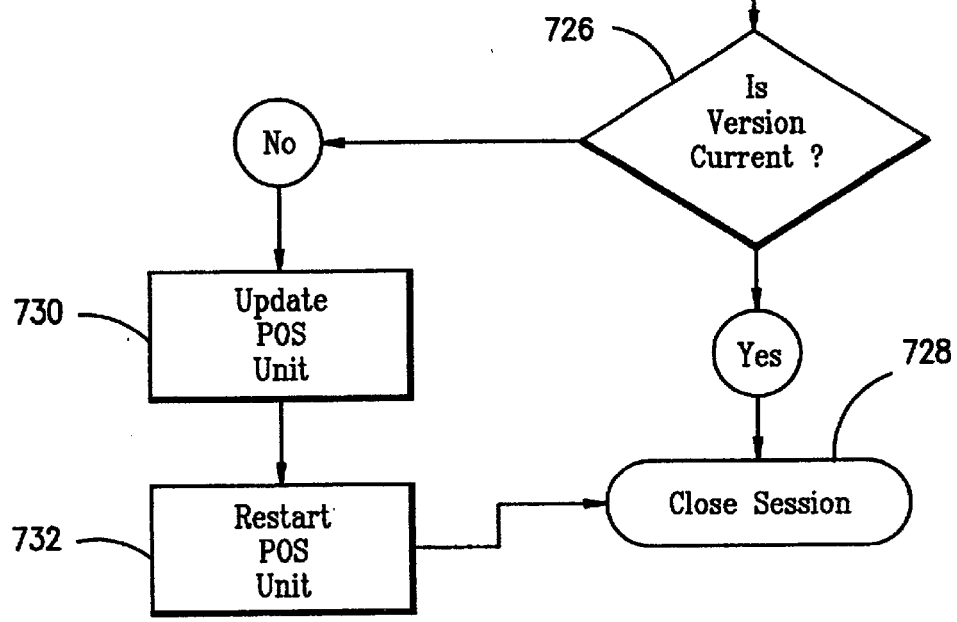
FIG. 9

METHOD FOR ROLLING SALABLE INVENTORY CONTROL AND SYSTEM THEREFOR

FIELD OF THE INVENTION

The present invention relates to inventory control systems and more particularly to an inventory control system of salable goods that are being carried on a transport, such as for example a train, that travels from a start location to an end location.

BACKGROUND OF THE INVENTION

A train traveling from one place to another that carries passengers may include a dining car, a café car and a lounge car. Goods usually in the form of foodstuffs and drinks are sold to passengers in each of those cars.

Prior to the instant invention, before a train departs a depot or train station, a given amount of inventory in the form of foods and drinks are loaded onto the appropriate cars from the commissary at that station. The service agent is also provided with a given amount of money to make change when the passengers make purchases. To monitor or keep tab of the inventory, either sold or on hand, the service agent provides to the manager at the depot station where the trip ends a handwritten sheet that indicates the amount and types of inventory sold or on hand at the end of the trip. Data relating to the inventory sold or on hand at the end of the trip is then manually input to a workstation at the depot station, or some other place, so that it may be relayed back to a central or headquarters computer where the data may be analyzed by the management of the railroad company.

Since the goods or inventories from one train may be transferred to another train, negative inventories may be reported back to the management of the railroad company. Consider for example the following. There were five cases of soft drinks left on train 1 at the end of its trip. These five cases were to be returned to the commissary. Train 2, which happened to be at the same depot station as train 1 was short of that type of soft drinks. Upon request from the service agent at train 2, the service agent at train 1 transferred the five cases of soft drinks from train 1 to train 2. Thus, instead of the commissary at the depot station receiving the five cases of soft drinks from train 1, those five cases of soft drinks were transferred to train 2. Since the report that five cases of soft drinks were returned to the commissary most likely had not yet been forwarded to the management, the management would not have incremented those five cases when train 2 left the depot station. Yet train 2 had reported that it had been stocked with five cases of soft drinks from the same commissary, thus decrementing the inventory by five cases. The net result is that there is a negative inventory of five cases of soft drinks at the commissary located at the depot station. This lag of information results from the manual input of data and the handling of sheets of handwritten notes. Accordingly, problems, both in terms of the inventory and the pricing of the items, result. In other words, the revenues generated from the inventories being sold on the trains traversing throughout the various routes in the system may not be accurate, thereby reflecting poorly on the financial records and accounting systems of the railroad.

SUMMARY OF THE PRESENT INVENTION

The present invention inventory control system utilizes a portable terminal, acting as a point of sale cash register, that is adaptable to download data relating to the inventory that is stocked onto a transport such as for example a train from a workstation at the commissary of the depot station where the goods are removed and loaded onto the train. The data relating to the amount of inventory is input to the portable terminal at the beginning of the trip. Once the goods are loaded onto the train, the portable terminal is docked to the appropriate car of the train, such as for example the diner car. As the inventory is depleted during the trip such as for example by being sold or becoming unusable, the amount of inventory left is updated to the portable terminal. This is usually done when a sale of a particular item to a passenger is made.

At the end of the trip, with the information relating to the amount of inventory depleted during the trip having been entered thereinto, the portable terminal is removed from the train. At the commissary of the depot station where the train is at and where the inventory remaining from the trip is being unloaded, the service agent in charge of the portable terminal connects the portable terminal to a workstation located thereat so as to upload the data stored in the portable terminal to the workstation. The workstation then uploads the thus retrieved data from the portable terminal to a host server that may be centrally located or located at the headquarters of the railroad company. The management at the headquarters could then readily determine the amount of inventory that was sold during the trip, the spoilage that occurred during the trip, and/or other of interest information such as for example the best selling items and/or the least desirable items during the trip. The types of items that should be requisitioned for the next trip on that route may then be updated.

In addition to reporting the inventory, data relating to the remittance collected during the trip could also be stored in the portable terminal and reported to the management by way of the upload and download workstation located at the depot station so that an accurate assessment of revenues generated for the trip, as far as the inventory being sold during the trip is concerned, could also be ascertained promptly. The tracking of the inventory that moves with the train could also be closely monitored from the data input to the portable terminal. For example, if certain items of the inventory on the train were transferred to another train, that transfer of those items would be recorded in the portable terminal and further reported to the management, when one of the trains has reached a depot station where an upload/download workstation is located.

The portable terminal of the instant invention could also be interconnected with another portable terminal so as to form a private communications network on any given train. For example, a point of sales (POS) portable terminal docked to the diner car may be communicatively connected to another portable terminal at the café car, so that the overall inventory stocked in both cars of the train can be determined. Thus, items from one car under the control of one service agent may be transferred to the other car so as to be under the control of the other service agent at the other car. Transferring or running a multi user restaurant within one train car could also be accomplished by interconnected multiple terminals within the same car.

To enable the portable terminal to perform the various functions it is required to do, a number of software modules are provisioned in each of the portable terminals assigned to a particular service agent on each train traveling throughout the railroad network. These modules include, among others, a back order module, a control panel module, a data replication module, a dining car setup module, a forced update module, an interim version control module, an inventory adjustment module, an inventory module, an inventory synchronization module, a menu management module, a point of sale module, a security management module, a system configuration module, a temperature monitoring report module, a trip module, and a version control module.

It is therefore an objective of the present invention to provide a method of controlling the inventory on a transport that moves along different routes throughout a transportation system.

It is another objective of the present invention system to be able to keep tab of the rolling inventories carried by different transports such as trains across various routes throughout a transportation network, such as for example a railway network.

It is still another objective of the present invention to provide a portable terminal for each service agent at each train so that the inventory being controlled by each of the service agents is carefully monitored.

It is furthermore another objective of the present invention to provide a portable terminal that acts as a point of sale cash register as well as a repository that records each transaction relating to the goods that occurred during a trip.

It is furthermore yet another objective of the present invention to enable the management to readily determine the types of items, and the accessories that support the items, that may best be provisioned on a train for a given trip.

BRIEF DESCRIPTION OF THE FIGURES

The above mentioned objectives and advantages of the present invention will be apparent and the invention itself will be best understood with reference to the following description of the invention taken in conjunction with the accompanying drawings, wherein:

FIG. 8 is a flow chart of the employee assignment module of the instant invention;

FIG. 9 is a flow chart illustrating the interim version control module of the instant invention;

DESCRIPTION OF THE INVENTION

In a transport network for example a railroad network, when inventory is requisitioned for a train for a trip on a given route, the management at corporate headquarters would assign the train to which the inventory is to be stocked a train number. A file containing the ingredients and the quantities of the items that make up the inventory is generated and posted by means of any one of the upload/download workstations that are located at commissaries adjunct to depot stations throughout the railroad network. A lead service attendant, basically a waiter for directing the sale of food and service activities on a particular train car to which the inventory is to be stocked, is assigned a point of sale (POS) device in the form of a portable terminal. By connecting the portable terminal to one of the upload/download workstations at the commissary where the inventory is loaded to the train, data relating to the amount of inventory from that commissary loaded onto the train is stored in the POS device. When the train begins its trip, the POS device is attached or connected to its docking station at one of the cars of the train, for example at either the diner car, the lounge car or the café car. Upon input of the train number, the amount of the inventory and the items that make up the inventory are posted to the POS.

As the train moves from the start location to the end location of the trip, the portable terminal POS device would act as a conventional cash register, so that items of the inventory depleted during the trip are recorded. In addition, the remittance or monies collected for the sales of the items during the trip are also recorded. At any train station during the trip, the service attendant could off load any of the inventory, by for example transferring it to another train or unloading it to the commissary, if any, that is located at that train depot station. At the end of the trip, the service attendant undocks the POS portable terminal from the train, connects the POS device to the upload/download workstation located at the commissary of the end depot station, and uploads the data stored in the portable terminal to the upload/download workstation. The data downloaded from the POS device is then transmitted by the workstation to a server centrally located or at the headquarters for use by the management of the railroad company.

Figure 1:
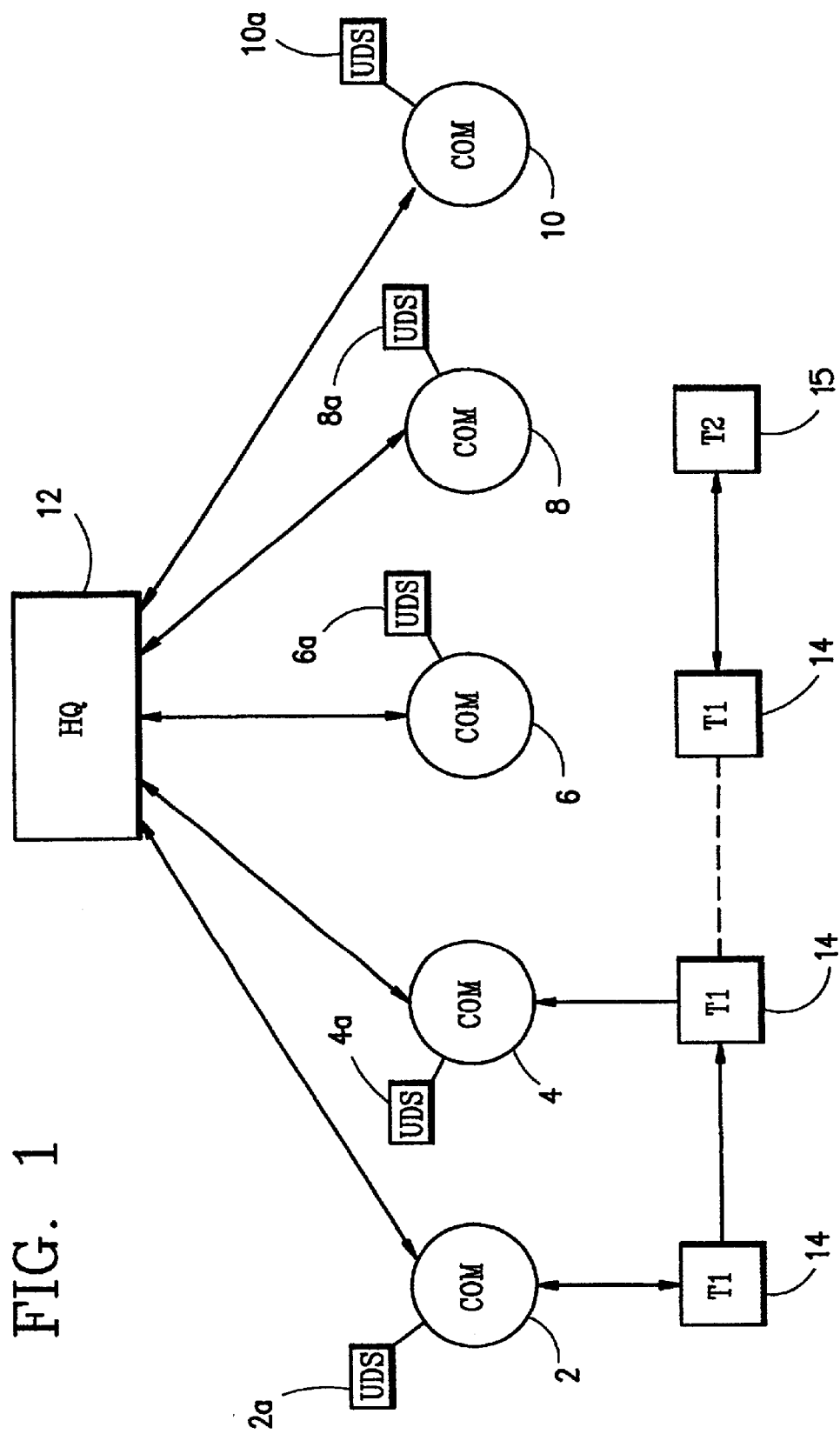
FIG. 1 is an overall view of the system of the instant invention.

The above brief overall summation of the instant invention is illustrated in FIG. 1. In particular, FIG. 1 shows a number of commissaries 2–10 each communicatively connected to a server 12, most likely centrally located at the company headquarters. At each of the commissaries 2–10 there is provided at least one upload/download workstation 2a–10a, respectively. It is by means of these workstations 2a–10a that bidirectional communications are effected between the respective commissaries and server 12. Each of commissaries 2–10 is presumed to be located at a corresponding depot or train station to which trains arrive and depart.

As further illustrated in FIG. 1, a transport such as for example train 14 is shown to have arrived at commissary 2. For the illustration of FIG. 1, train 14 is assumed to be picking up inventory from commissary 2. Data relating to the particular type of inventory and the amount of the inventory are recorded, by means of a portable POS terminal device assigned to the lead service agent of train 14. The downloading of the data to the portable terminal is done by the service agent connecting his assigned portable terminal to the workstation 2a at commissary 2. Once the data is downloaded to the portable terminal, when the service agent arrives at the particular car for example the diner car of the train, he would connect the portable terminal to the appropriate docking station in the car, so that the portable terminal at that time forward will act as a POS device for recording items from the inventory that are sold to the passengers of the train, and any items of the inventory that conceivably become spoiled or unusable. The ingredients, which may also be referred to as the recipe, that make up each item are also recorded. Such ingredients may include for example in the case of a special meal that includes a hamburger, a soft drink and an order of french fries, the napkin, straw, and container of the hamburger.

As the inventory gets depleted as train 14 traverses from the start location at commissary 2 to the location represented by commissary 4, the service agent may notice, by means of a display on the POS device, that his inventory is running low. At that time, he could replenish his inventory by requisitioning additional items from commissary 4. The same procedure with which inventory is stocked onto train 14 that was done at commissary 2 is repeated at commissary 4. In other words, the service agent would remove his portable terminal from its docking station at the diner car, connect to workstation 4a at commissary 4, and with the appropriate requisitioned inventory being loaded onto train 14, download the amount of inventory requisitioned from workstation 4a. Thereafter, the portable terminal is redocked at its docking station at the dining car, so that sales of the items of the inventory would once more proceed.

On the other hand, if commissary 4 happens to be the destination depot for train 14, then whatever leftover inventory on train 14 is unloaded to commissary 4. Once more, the portable terminal is removed from its docking station at the diner car and connected to workstation 4a. The data in the portable terminal, now representing the remaining inventory, or inventory that were sold or no longer salable, is uploaded to workstation 4a. This data in turn is transmitted by workstation 4a to server 12, so that the management of the company can readily ascertain how much inventory was sold, the revenue that was generated as a result of the sales, and the kinds of items that were sold.

Assume instead of unloading all of its inventory to commissary 4, it so happens that another transport such as for example train 15, also at train station 4, is in need of certain items that are in the inventory on board of train 14. In this instance, the needed items, for example five cases of soft drinks, are unloaded from train 14 and loaded onto train 15. The information relating to the unloading and reloading of the five cases of soft drinks is recorded on the respective portable terminals assigned to the service agent on train 14 and the service agent stationed onboard of train 16. As before, the data relating to the transferred items, i.e., the five cases of soft drinks, is uploaded to the workstation at the commissary, so that the data could be transmitted to server 12 at the headquarters. Accordingly, the management at the headquarters could readily ascertain that there is no negative inventory at commissary 4 and that the items that should have been removed from train 14 and stored in commissary 4 had in fact been transferred to train 15, and is now part of the moving or rolling inventory of train 15.

Figure 2:
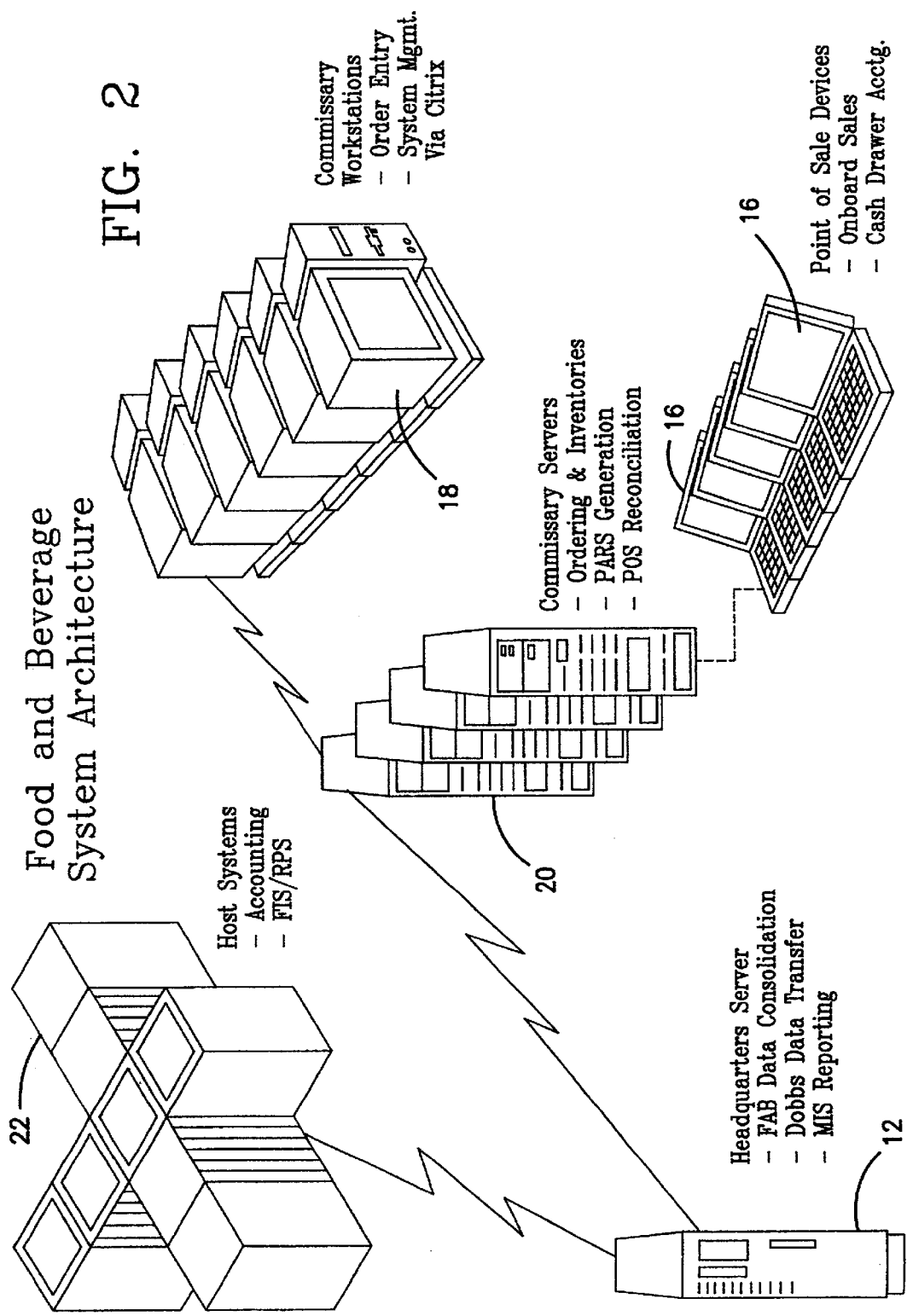
FIG. 2 is an illustration of the various components that make up the architecture of the system of the instant invention.

With reference to FIG. 2, the architecture of the system of the instant invention is shown. In particular, from the point of view of a point of sale device, i.e., any one of the portable terminals 16, once assigned to a service agent or undocked from the train by the service agent, is communicatively connected to one of a plurality of workstations 18 that are located either individually, or in multiple, across the various commissaries at the different train stations spread out throughout the railroad network. A file is either downloaded from the workstation to the POS device for informing the device the amount and types of the inventory that are stocked onto the train to which the service agent is stationed, or uploaded from the POS device to one of the workstations 18 to inform the system of the amount of remaining inventory on the train to which the POS device has been docked and to which the service agent assigned to that POS device is responsible for. Additional information such as the remittance collected from the sale of the inventory during the trip could also be included in the file uploaded to the workstation from the POS device. The more important functions of the POS device, i.e., the onboard sales and the fact that the POS device acts as a cash register, are shown in FIG. 2.

The more important functions of workstations 18 are order entry, which relates to the amount of inventory either uploaded from or downloaded to the POS devices, and system management, which relates to the communication of information either sent to or collected from the POS devices to the management of the company by way of the headquarters server 12. The transmitting of the information to and from the headquarters server may be controlled by the Replication Manager of the Amtrak system.

The information from a workstation could be transmitted directly to the headquarters server, or may first be sent to one of a plurality of commissary servers 20, which functions may be consolidated into the headquarter computer server 12. Either at commissary servers 20 or headquarter server 12, the information is taken into consideration for ordering the required inventories, and keeping tab of the available inventories on hand for the various trains. Further, a PARS generation for defining the amount of inventory that is to be associated with a given route for a particular train is performed. Furthermore, a point of sale reconciliation whereby the amount of inventory sold by each service agent in a particular train during a given route, and the amount of monies that the service agent should be remitting back to the commissary is performed. If the PARS generation and reconciliation functions were performed by a commissary server 20, then once the various functions are completed with respect to the information uploaded from a particular POS device, that information is uploaded to the headquarters server 12.

A data consolidation process with respect to the inventories, i.e., the foods and beverages, that were sold on the various routes by the various trains, further takes place in server 12. Information with respect to the amount of inventories that were used or returned to the vendor contractor such as for example the Dobbs Company, is reported. Moreover, a management information system report to be provided to the management of the company is prepared. After those major functions are performed at headquarters server 12, the information required by the management is routed to a host processor system 22, which may be an IBM OS/390 computer. There, an accounting process is performed to determine the amount of revenues generated. This may be done by means of a financial information system and a revenue provisioning system (FIS/RPS).

Figure 3:
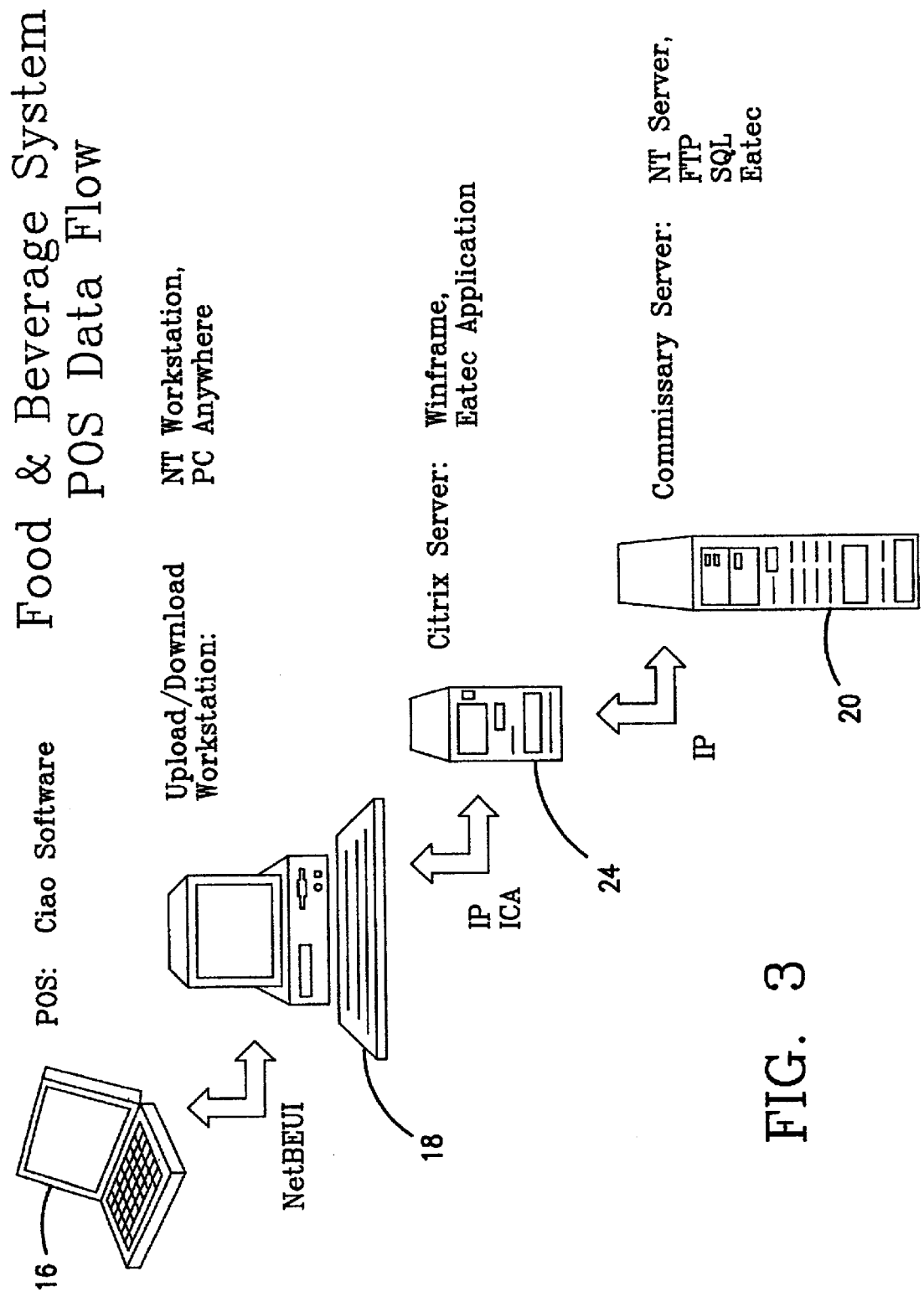
FIG. 3 is an illustration of the data flow protocols that goes on among the portable terminal, the upload/download workstation and its server.

Another view of the respective interconnections among the various components, including the server that provides the programs for the operation of the plurality of workstations, is given in FIG. 3. As shown, POS device 16 is communicatively connected to upload/download workstation 18 by means of a network protocol NetBEUI. The operation of POS device 16 is based on a proprietary Ciao software by the Cache Box Company of Arlington, Va. The plurality of software modules that make up the Ciao software will be discussed, infra.

Even though the network protocol NetBEUI is used in the FIG. 3 embodiment, it should be appreciated that other conventional network protocols such as for example TCPIP could also be used.

Workstation 18 is a workstation that runs under the Microsoft NT operating system. To enable it to communicate remotely with another workstation or with a POS device, a remote access program such as for example PC Anywhere is provisioned in the workstation. Of course, the same remote access program is also provisioned in the POS device if remote communication between the POS device and the workstation is to take place. The aforementioned Ciao software by the Cache Box Company is also provisioned in workstation 18.

There are a number of files that are uploaded or downloaded from workstation 18. Among these include the SAL file, which contains the sales information. Another file that is upload/download from workstation 18 is the MED file, which is a media file for determining how the payments for the inventory were made, whether the payments were cash transactions, credit card or debit card transactions, etc. There is furthermore the DOM file, which is used in the case where a credit card is used by a passenger. The DOM file sends the credit card information to the host FIS system so that credit information may be obtained from the credit card clearing houses. Another file that is upload/download from workstation 18 is the TAX file, which figures out the tax to be charged at a particular location, such as for example the state that the train is traveling in, so that the appropriate sales tax for a transaction may be calculated.

Workstation 18, instead of directly connected to commissary server 20 as shown in FIG. 2, may actually be interconnected to a server 24, which runs on the Winframe software by the Citrix Company. Another application that server 24 is provisioned with is an application program by the Eatec Company of Berkeley, Calif. The Eatec application is a food and beverage inventory management software that inventories the items that are stocked, sold, and/or returned to the commissary for each route to which a train is assigned.

Server 24 in the embodiment of FIG. 3 provides the particular inventory control capabilities to the different workstations 18 dispersed among the various commissaries. In particular, server 24 provides the various screens of the inventory control Eatec application to the various workstations, so that the Eatec application needs only to be stored in a small number of servers 24. To enable communication between server 24 and workstation 18, an internal protocol (IP) and an independent computing architecture protocol (ICA) are used.

Commissary server 20, as shown in the FIG. 3 embodiment, is an NT server that operates under the file transfer protocol (FTP) and the structured query language (SQL). In addition, it could act as the server of the Eatec application.

Figure 4:
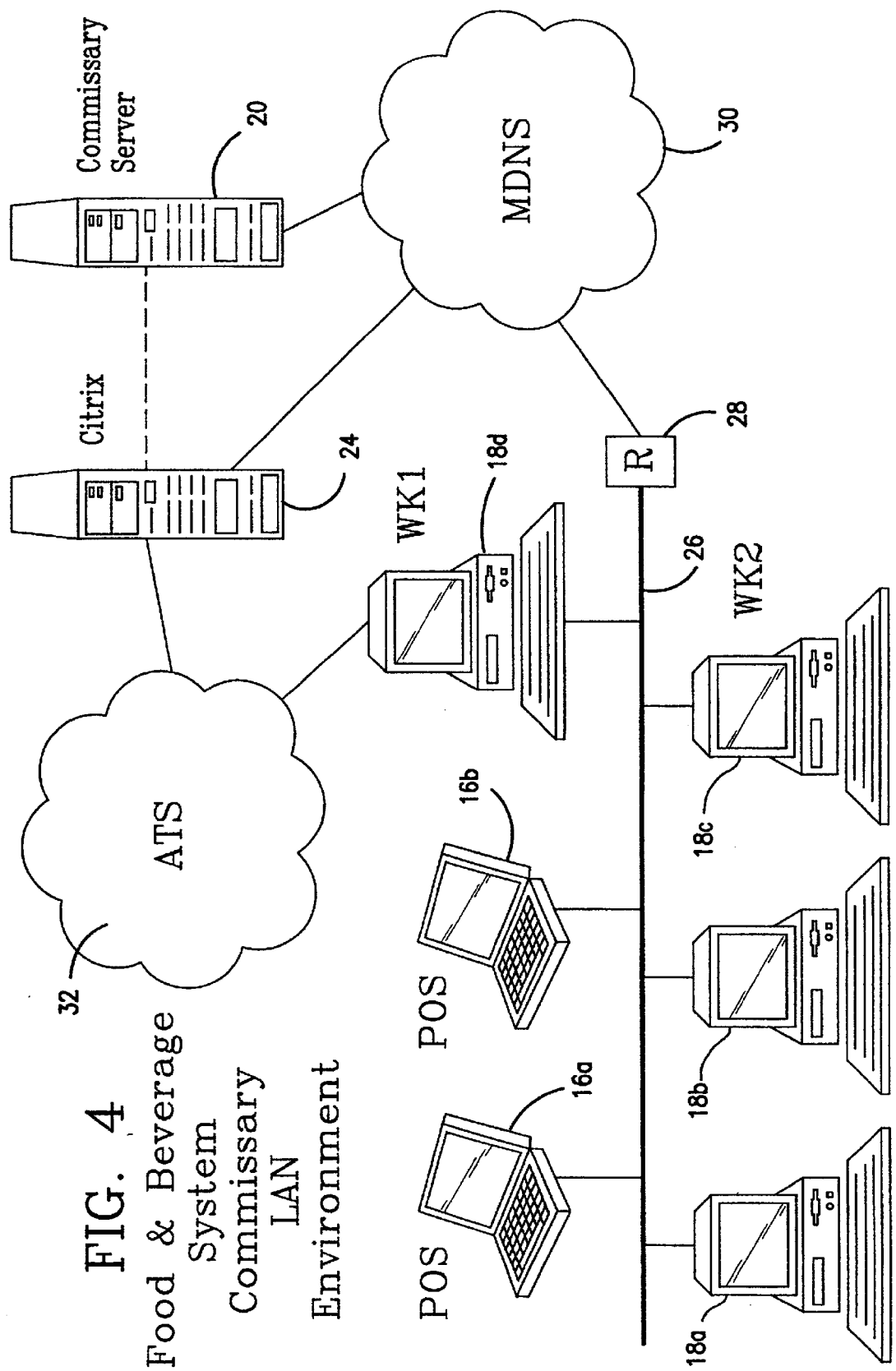
FIG. 4 is an illustration that focuses onto the interconnections among the various portable terminals and the workstations of the instant invention system.

With reference to FIG. 4, the interconnections that enable the various components of the instant invention system to communicate with each other is shown. In particular, exemplar POS devices 16a and 16b, as well as exemplar workstations 18a–18d, are each assumed to be equipped with the appropriate transceiver means such as for example the necessary ethernet card and cables so as to be adaptable to be connected to a local area network (LAN) 26. Accordingly, each of the POS devices can communicate with each of the upload/download workstations dispersed throughout the various train stations of the railroad network. As each of the POS devices is given a number that corresponds to the service agent, and the train number, to which it is assigned, irrespective of whichever workstations the POS device is connected to, the same information that particularly pertains to the given train and that service agent is upload/downloaded from the workstation.

Connected to LAN 26 is a router 28 that enables the workstations to be connected to a wide area network (WAN) 30. From the WAN 30, a connection could be made between each of the workstations 18 and either server 24 or commissary server 20. As shown in FIG. 4 and previously in FIG. 3, server 24 is in communication with commissary server 20. In the event that the connection of the workstations to servers 20 and 24 by means of WAN 30 is inoperational, a connection could be made to server 24 from the workstations by means of the conventional telephone service 32 of the company, in this instance Amtrak's telephone service (ATS). Each of the POS devices and the workstations may further be equipped with the appropriate remote communication peripherals such as for example a modem so that wireless communication may be effected among the POS devices and the workstations separately, or any one of the POS devices with any one of the workstations.

Although not shown, each of the POS devices could in turn be connected to at least another POS device on a particular train through a given route. For example, a service agent provided with a given POS device, after having downloaded the relevant data from a workstation located at the commissary where the inventory is loaded onto the train, could dock his POS device to the docking station at the diner car. Another service agent, with his or her assigned POS device, could then dock that POS device to the docking station at the café portion of the kitchen car. By establishing communication between the two POS devices either by hardwire or telecommunication in the conventional manner, a mini communications network is established to thereby enable each of the service agents to determine the items that are available on the train, so that if one service agent runs out of a particular item that happens to be available on the other car, he could request that a given quantity of that item be transferred to his station. Of course, the data relating to the transferred item is recorded in both of the POS devices.

As was pointed out earlier with respect to FIG. 3, each of the POS devices in essence is a portable terminal that is provisioned with the requisite transceiving hardware and a plurality of software modules each enabling the POS device to perform a given function. Some of these functions are discussed hereinbelow.

Figure 5:
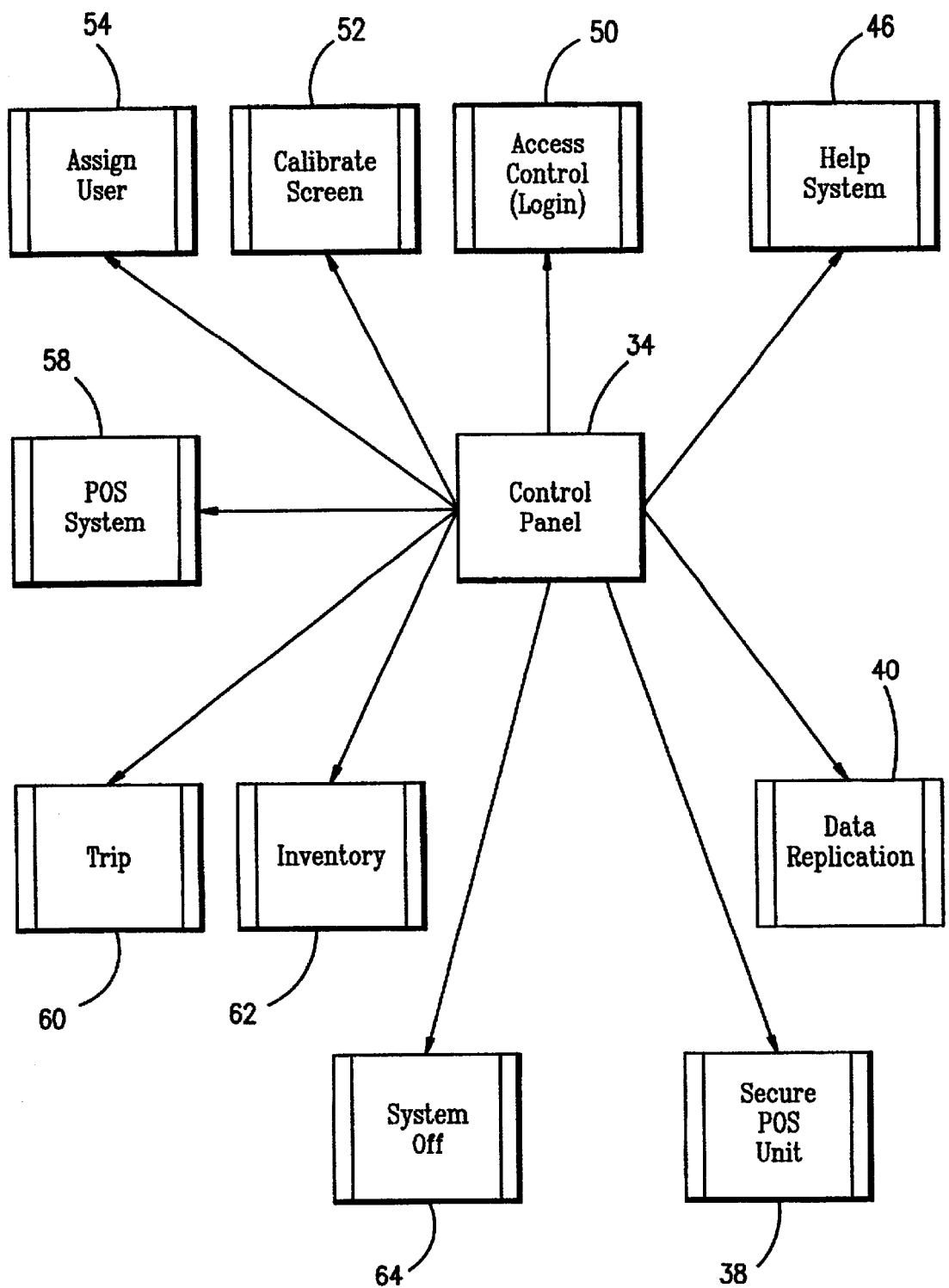
FIG. 5 is a flow chart of the control panel module that is provisioned in a portable terminal of the instant invention.

The first module provisioned in each POS device that enables it to access other functions is the control panel module, as shown in FIG. 5. The control panel module enables a service agent to retrieve or manipulate the different functions that are available for each POS device while the POS device is docked to a docking station on the train. With the control panel module, access control is provided to the service agent in charge. There is also a centralized access point, at the POS device, that enables the service agent or the service agents on the train to utilize all of the reports and functions while the train is traveling along its route. Data management is provided with such control panel for the decentralized flow of data collected on the train. Thus, all relevant data from any given trip, at least with respect to the inventory relating to the foods and beverages being served on that train for that route, is gathered in one central location, namely the POS device. Moreover, by using the control panel module, no paper records, which were used previously and were difficult to maintain, no longer are needed. Finally, other functions such as for example the required temperature measurements of the stocked foodstuffs by the government could also be dealt with quickly.

As shown in FIG. 5, control panel module 34 has connected thereto a plurality of other modules. Each of these modules, most of which will be discussed further, in turn is provisioned in each POS device. As shown, connected to control panel module 34 are a secure POS unit module 38, a data replication module 40, an update system module 44, a help system module 46, an access control log on module 50, a calibrate screen module 52, an assign user module 54, a POS system module 58, a trip module 60, an inventory module 62 and a system off module 64.

Figure 6:
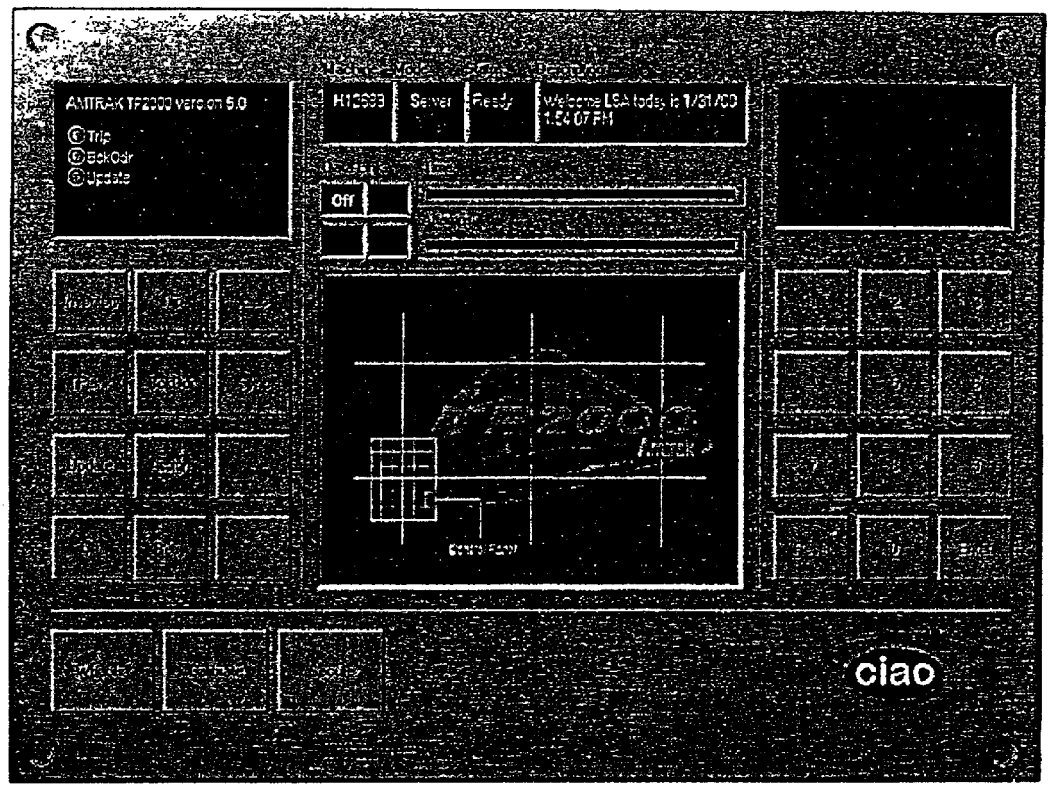
FIG. 6 is an image of the control panel of the portable terminal illustrating in particular the various controls available on the portable terminal.

The control panel as seen after login on the screen of the POS device is shown in FIG. 6. With the system being in a server mode, with respect to having been connected to another POS device on the train, the available options are displayed on the left keypad. Insofar as the POS device whose screen is shown in FIG. 6 is acting as a server, the grey out options are not available. Note that the connection information is displayed across the top and the version number of the software module as provisioned in the POS device is displayed on the upper lefthand window. The keypad displayed on the right hand side of the screen is used for login.

Figure 7:
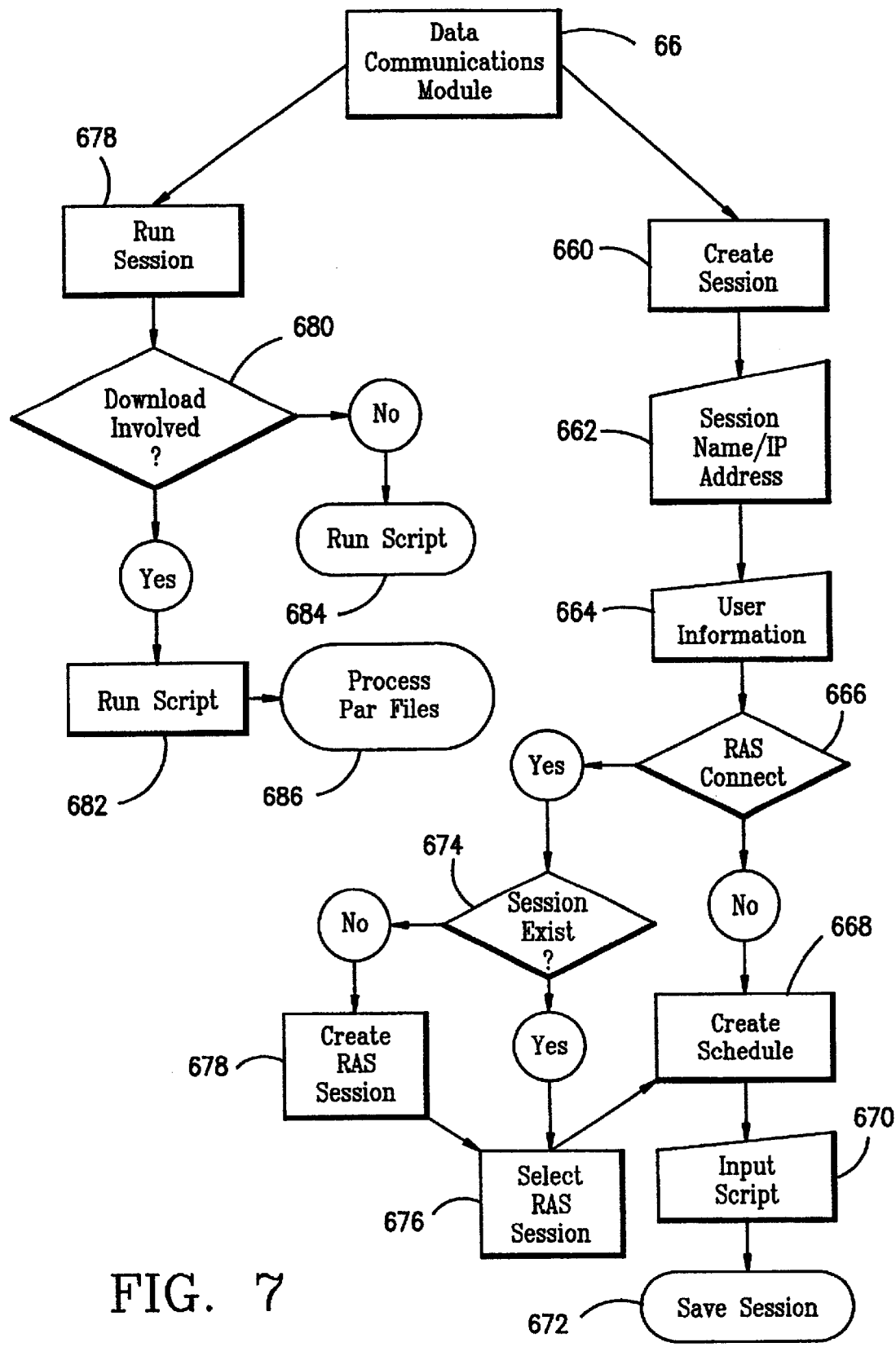
FIG. 7 is a flow chart of the data communications module of the instant invention system.

One of the modules that is necessary for the operation of the various workstations is a data replication module, as shown in FIG. 7. This module is necessary insofar as the railroad company must distribute information over and retrieve information from a nationwide network with which includes a plurality of upload/download workstations in diverse locations. There is therefore a need to be able to distribute inventory level (PAR) files to the individual workstation for downloads to the POS devices. Likewise, after information has been downloaded from the POS device to a workstation, the information must be uploaded by the workstation to the host system server 22 as shown in FIG. 2. The data replication module is therefore able to utilize various protocols such as for example the TCP/IP and FTP. Moreover, it is capable of running multiple sessions with little or no interval between sessions, and able to be configured so as to allow scheduled uploads and downloads on predetermined time periods such as for example monthly, weekly, daily, hourly or minute increments, or on a one time basis. In the case of PAR files, it is able to differentiate between full PARS and back orders, and process them accordingly.

The objectives of the data replication module, as illustrated by the flow chart of FIG. 7, include generating an easy to use and understand user interface that would display the available existing connection options, the current status of all open connections, and an error log display displaying any errors that occur. In addition, a submodule or a subroutine in the program compares the incoming PAR files to determine if they are new PAR files or back orders for existing PAR files for appropriate processing. When a new communication session is to be run, it is configured to dial up.

In particular, for the data communications module 66, there are two alternate sets of steps it can take. Consider the create session path that starts with process 660. Once it is determined that a session is to be created, a session name and the IP address are determined per process 662. Thereafter, user information is input per step 664. A determination is next made per process 666 on whether there is a connection. If there is not, the schedule for uploading and downloading is created per process 668. Thereafter, the particular input script is prepared for process 670. Note that a scripting engine with the most commonly used FTP commands reconfigured for insertion into the scripts is provided. Once the input script is prepared, the session is saved, as indicated per process 672.

Now consider the other path of the data replication module 66. There a run session is begun at process step 678. Whether or not the session needs to be downloaded is determined per process step 680. If download is involved, then the script for downloading is run per process step 682. Thereafter, the PAR files are processed per step 686. On the other hand, if no download is involved, then the script of the session could be run directly per process 684.

The flow chart for the employee assignment module 70, which relates to the assign user module 54 shown in FIG. 5, is illustrated in FIG. 8. The purpose of the assign employee module is to enable a lead service agent that operates a POS unit in a client-server environment on a train the ability to add an additional user for the POS unit so as to allow multiple persons to access the same database simultaneously. This capability is one directional so as to preclude a lead service agent from being able to add someone who is above him, such as for example a manager, or a worker service agent from adding a lead service agent to use the POS unit.

To achieve this end, personal identification keys (PINs) are provided to the various service agents assigned to the trains. A data table with the names, social security numbers and PINs for every lead service agent as well as any data entry or IP personal who need access to the POS devices is provided in the instant invention system. Thus, to enable a service agent to add an additional user to his server-client connected POS units, the service agent has to add a new PIN for the selected person, per step process 702. Thereafter, a particular access level such as for example a regular service agent level is assigned to the service agent by the lead service agent per process step 704.

FIG. 9 is a flow chart illustrating the processes of an interim version control module 72. The purpose of the interim version control module is to provide a service personnel of the present invention system with frequent required program updates because of the potential problems that may be encountered. Thus, the interim version control module provides a more direct update, instead of the normal incremental updates. The interim version control process begins automatically when a POS unit is attached to an upload/download workstation. A monitoring program on the workstation will scan continuously for any attached POS units. A POS unit that does not have the current version, upon being attached to the workstation, is updated to the most current version. An on screen status report for the managers of the workstations details the current status for each of the POS units that is attached to the workstation and any update that may be in progress were a POS unit not programmed with the most updated version. A POS unit will restart once it has been updated.

The flow diagram of the FIG. 9 interim version control update 72 therefore starts with the process step 722 whereby the workstation to which a POS unit is connected scans the POS unit to determine what version of program that POS unit contains. The determination of the version of the operational program in the particular POS unit is performed in process step 724. A determination is made in process step 726 to see whether the version that is contained in the POS unit is the most current version. If it is, the process stops per step 728. If it is not, the attached POS unit is updated with the most current version per process step 730. Thereafter, the POS unit is restarted per process step 732. Once that is done, the interim version control process ends per process step 728.

Figure 10:
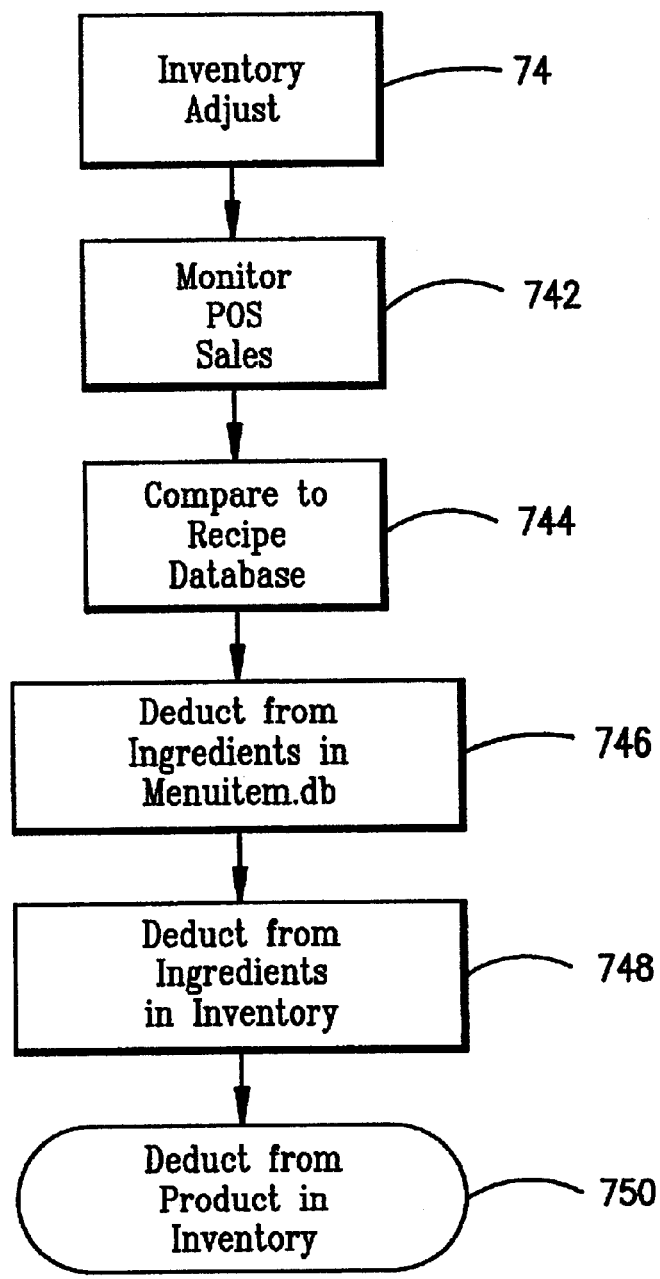
FIG. 10 is a flow chart illustrating the inventory adjustment module of the instant invention.

The next module that is resident in a POS unit is the inventory adjust module 74, as illustrated in the flow chart of FIG. 10. The inventory adjust module 74 actively monitors the depletion of the inventory stocked on a train during a trip, and reports the changes in the available items for sale back to the point of sale module. In addition, inventory adjust module 74 accounts for the variation in ingredients or recipes when calculating the available items for sale. As far as the service agent is concerned, the inventory adjust module 74 is transparent since it works in the background for monitoring the depletion of the inventory during the trip. In addition, all transactions that occur, i.e., entered into the POS device, are monitored. And the ingredients associated with the items that are depleted during the trip are taken into consideration in accordance with the file that contains the recipe for each of those items that are sold. For example, if a hamburger meal that includes a medium soft drink and an order of french fries was sold, in addition to the hamburger patty and the hamburger bun, the module would also take into consideration the amount of soft drinks and french fries that have been used, as well as the cup for the soft drink and the paper holder for the french fries. In addition, the napkins and other utensils such as for example plastic forks, spoons, and ketchup packages would also be taken into consideration as part of the ingredients or recipes for the hamburger meal.

The processing for the inventory adjust module 74 begins with the system monitoring any sales that are recorded to the POS unit attached to the train, per process step 42. When a sale is made for a particular item, the recipe for that item is compared with the recipe database stored in the POS device per process step 744. The ingredients that are depleted by the sale of the item are deducted from the menu item per process step 746. For example, assume that there are only 10 hamburger patties available on the train for a particular route. Therefore, there could only be a total sale of 10 hamburgers during the trip. Thus, there is a need to keep tab on the number of hamburgers sold so that, once all 10 hamburger patties have been used, some indication must be provided on the screen of the POS device that no more hamburgers could be sold. It is for this reason that process step 746 is necessary. In process step 748, once a sold item is recorded, the ingredients associated with that sold item are deducted form the inventory. Thereafter, the product is deducted from the inventory per process step 750.

Figure 11:
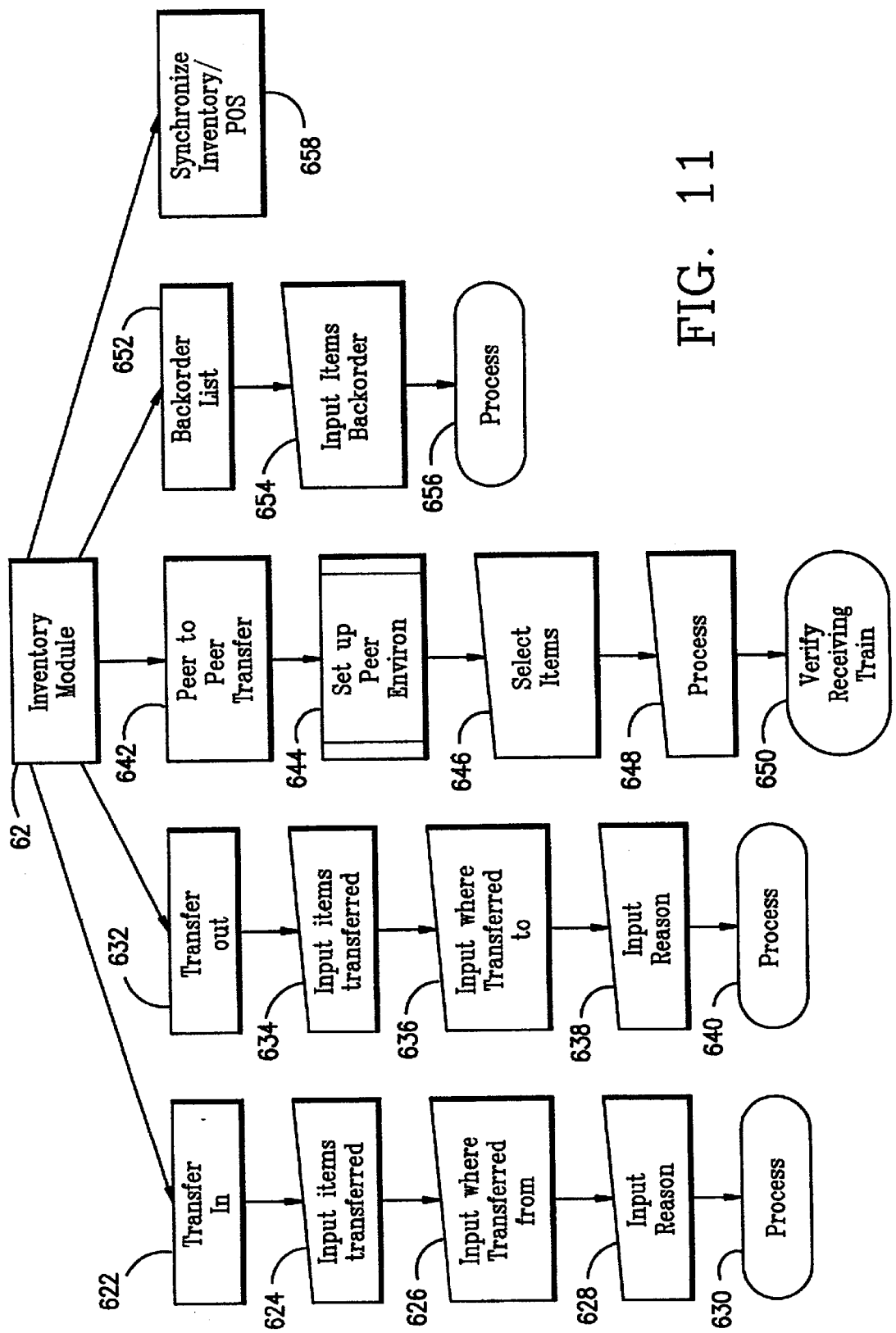
FIG. 11 is a flow chart illustrating the inventory module of the instant invention.

The process steps for the inventory module 62 shown in FIG. 5 are illustrated in the flow diagram of FIG. 11. The purpose of the inventory module 62 is the need to keep track of the inventory from the time of receipt from a particular commissary until the time the inventory is returned to that or another commissary, or transferred to another service agent. Thus, the inventory system module must be able to distinguish the differences between the ingredients and products, allow the service agent to transfer stock in and out of the inventory, view the current inventory by the available ingredient or products, prepare a back order request if additional ingredients or products are needed, and synchronize the POS programs with the inventory program. When conducting transfers, a service agent must be able to indicate where the stock was transferred to or from, and the reason for the transfer, which may include the fact that the product needs to be condemned or could no longer be sold.

For the inventory module 62, a set of database tables are created in order to capture the active inventory information on each of the trains and interface these database tables directly with the POS system module to make real time changes and to allow for real time monitoring of all inventory data. Moreover, the user is allowed to view the starting and the current actual quantities of ingredients and products, transfer the ingredient in and out, generate a back order list and synchronize the inventory levels between the inventory module and the POS module. Partial or complete automated transfer of inventory between two POS units could also be done with inventory module 62.

The various process steps of inventory module 62 are shown in the flow diagram of FIG. 11. To begin, when items are transferred to the car to which the POS unit is docked or under the control of the service agent to which the POS unit is assigned, a transfer in process 622 begins. The input items are recorded as having been transferred per step 624. Where the items were transferred from is input per process step 626. The reason for the transfer is further recorded per process step 628. The integration of the transferred in items to the inventory on hand is processed per process step 630.

If items were to be transferred out of the inventory stocked onto the car under the control of the service agent, such transfer out processes begin with process step 632. The items to be transferred are recorded per process step 634. Where the items are to be transferred is recorded per process step 636. The reason for such transfer is recorded per process step 638. The processing, i.e., deletion of the items from the inventory, takes place per process step 640.

If there is a transfer of items of the inventory to another service agent, the process begins per step 642. The environment to which the transfer is to take place is set up per process step 644. The items to be transferred are recorded per process step 646. The actual process of transfer is recorded per step 648. And if it is a train to which the items are transferred, the train number that received the transfer items is verified per process step 650.

If additional items are needed to be added to the inventory from one of the available commissaries along the route of the train, such back order list begins per process step 652. The items to be back ordered are recorded per process step 654. A back ordering process then takes place per process step 656. Lastly, to synchronize the inventory with the amount of inventory recorded in the POS unit, a synchronized inventory/POS step is performed per process 658.

Figure 12:
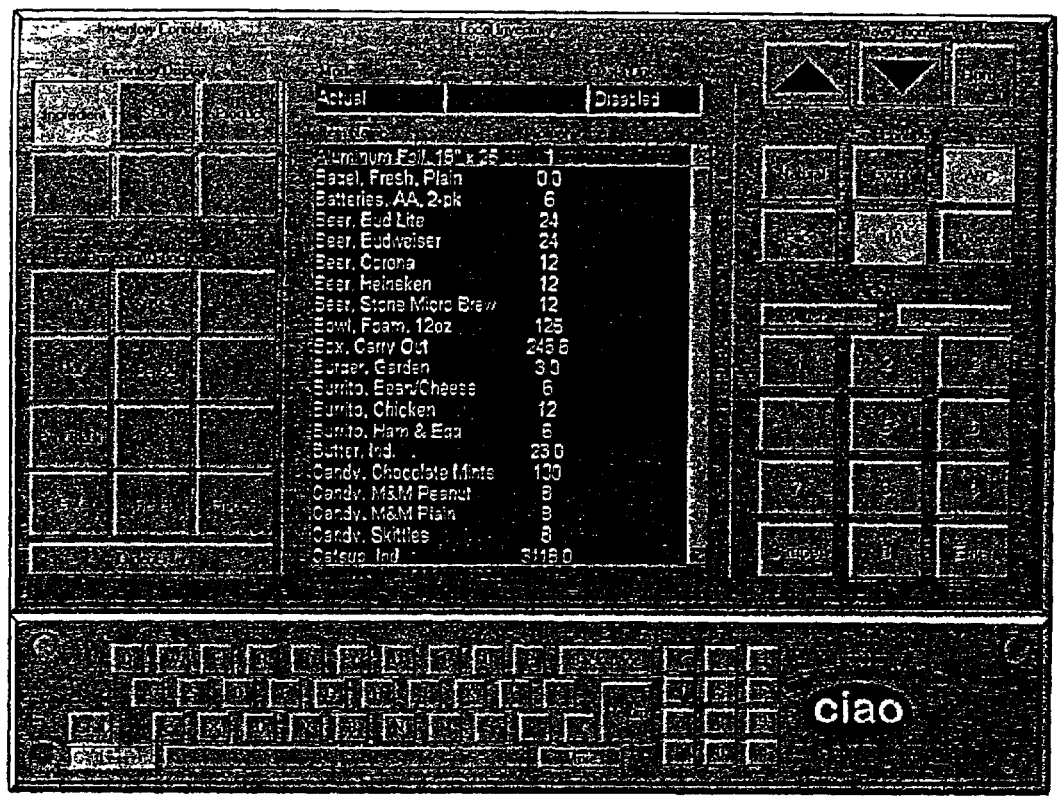
FIG. 12 is a view showing the various items in the inventory as being illustrated on the screen of the portable terminal of the instant invention.

FIG. 12 provides an illustration of the inventory module screen displayed on a POS unit. Note the various inventory functions as displayed on the left keypad.

Figure 13:
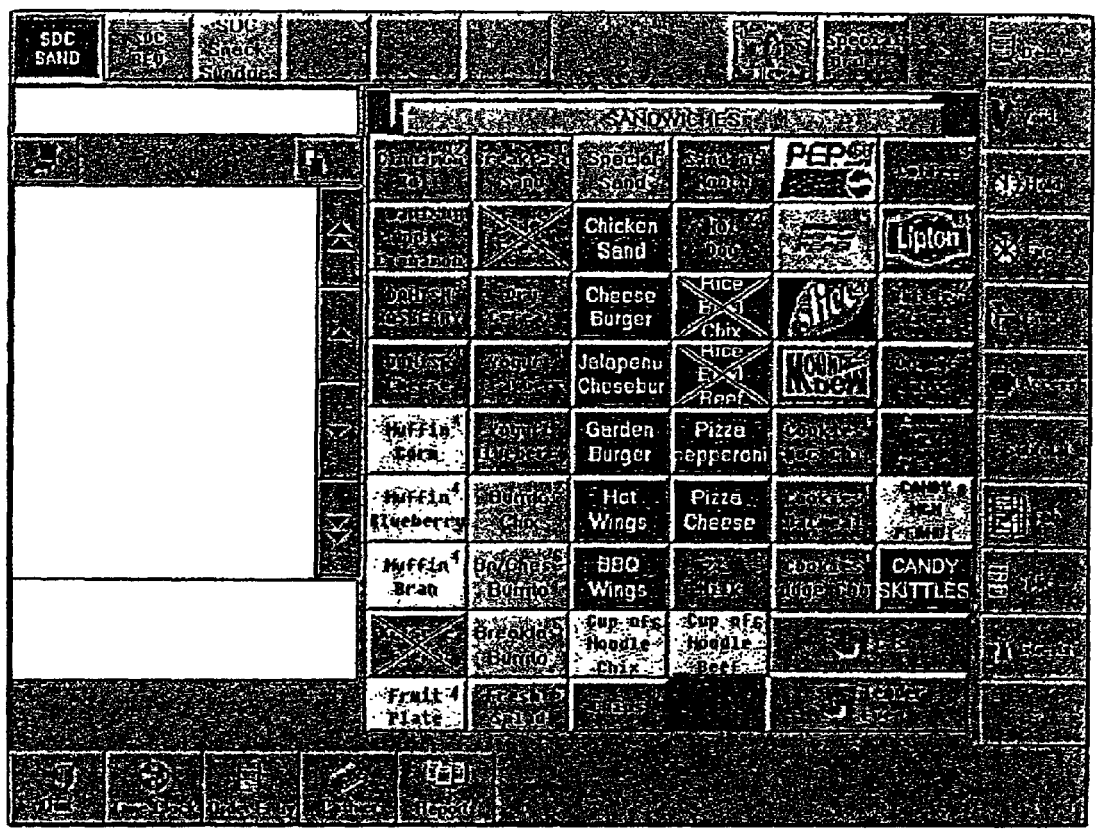
FIG. 13 is a view as shown on the screen of a portable terminal of a typical menu.

The screen on a POS unit that is displayed when the POS system module 58 as shown in FIG. 5 is called up on the POS unit is displayed in FIG. 13. As shown, the respective numbers in the upper right hand corner of the multiple buttons represent the number of each of the buttoned items available for sale. Thus, referring to the uppermost right hand corner of the item screen of FIG. 13, there remains 19 cups of coffee available in the inventory stocked onto the car to which the POS unit is docked.

Figure 14:
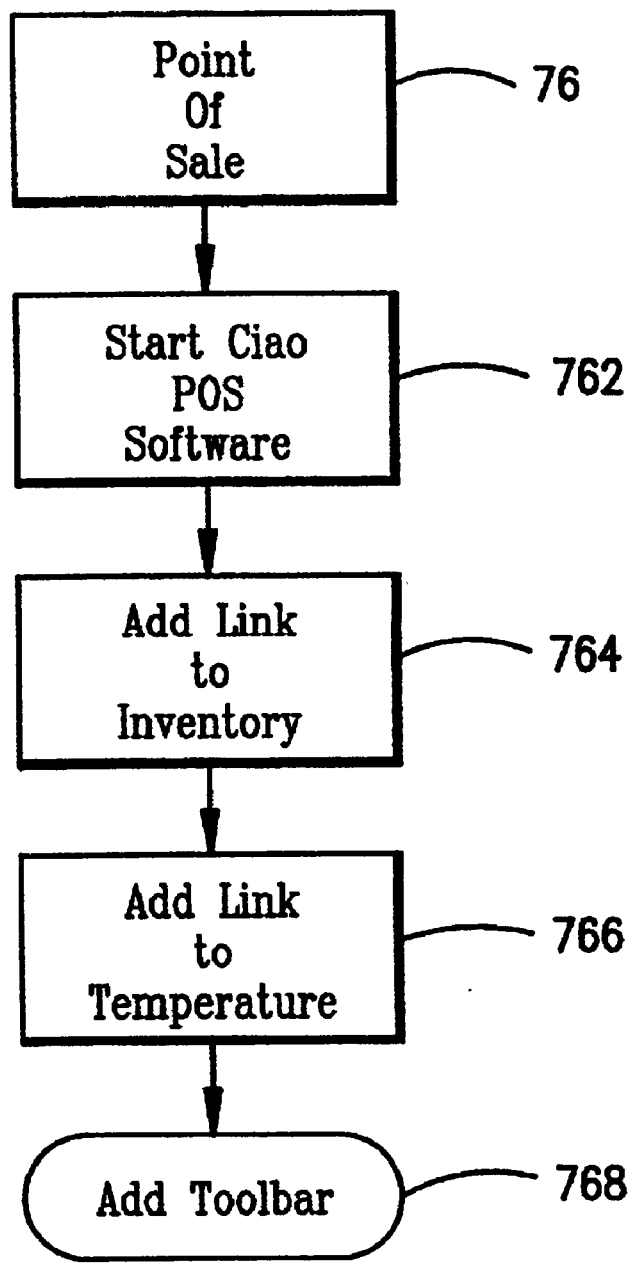
FIG. 14 is a flow chart illustrating the point of sale module of the instant invention.

The point of sale module 76 as shown in FIG. 14 resident in a POS unit enables the activation of the point of sale system, the inventory adjustment module and an interface with the inventory module and the temperature control module, to be discussed hereinbelow, simultaneously create a field operating environment in which the service agent sells his inventory. The purpose of the point of sale program is to enable the start of all programs necessary to establish an active operating environment for the service agent stationed on the train.

As shown in the flow diagram of FIG. 14, the point of sale module begins with the POS software being started per process step 762. A link is added to the inventory on hand per step 764. A further link is added to the temperature module per process step 766. A toolbar for the screen being displayed for the point of sale system is then added per process step 768.

A program to manage the security access control for the POS unit is also resident in a POS unit. This program is used to create and maintain the data files necessary for the control panel module to determine the right level of each of the POS users. Moreover, addition of new users of the POS unit is controlled by the security manager module. The editing of the existing data is also allowed, per the security manager module.

Figure 15:
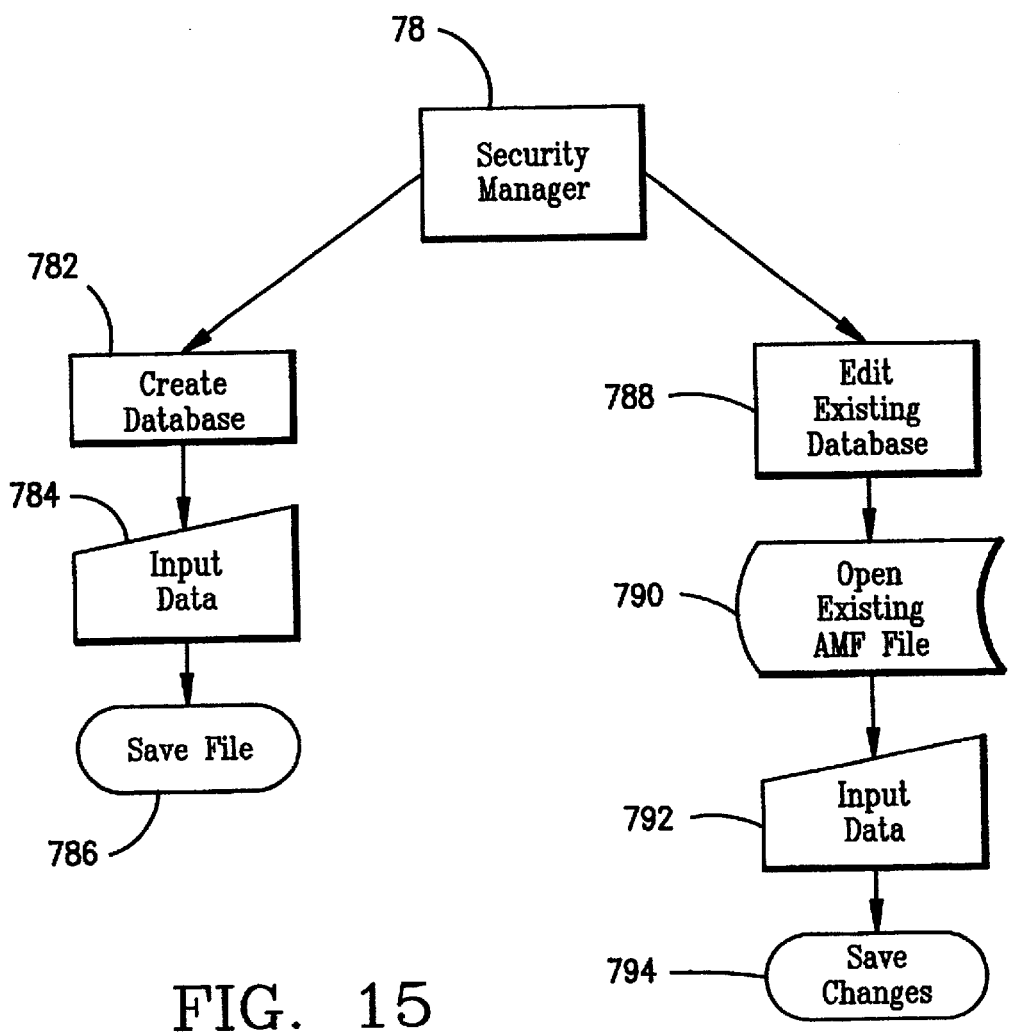
FIG. 15 is a flow chart illustrating the security management module of the instant invention.

With reference to FIG. 15, the various processes of the security manager module, which corresponds to the secure POS unit module 38 shown in FIG. 5, is illustrated. To begin, a security database is created per process step 782. The appropriate data for the database is input per step 784. The thus created file is saved per step 786. If there is already an existing database, such existing database is edited per process step 788, by opening the existing file per process 790. Data is input to edit the existing data base per process step 792. The edited database is saved per process step 794.

Figure 16:
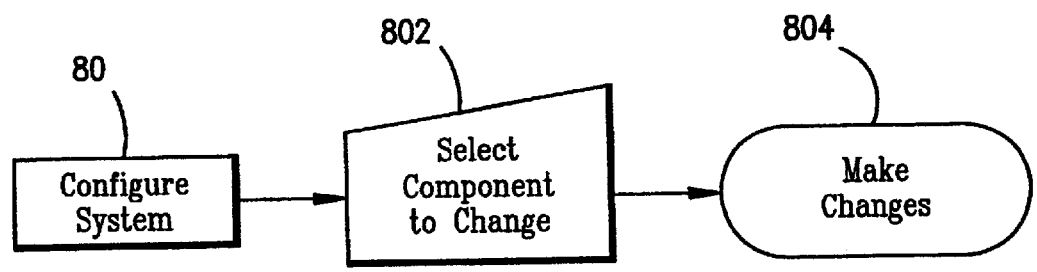
FIG. 16 is a flow chart illustrating the system configuration control module of the instant invention.

The personnel responsible for maintaining and updating the system of the present invention needs a configuration tool that provides a graphical interface which allows them to rapidly identify and configure the components associated with the system. Such system configuration module is illustrated in FIG. 16. As shown, configure system module 80 includes the step of selecting the component that is to be changed per process step 802. Changes to the component are made per process step 804.

Figure 17:
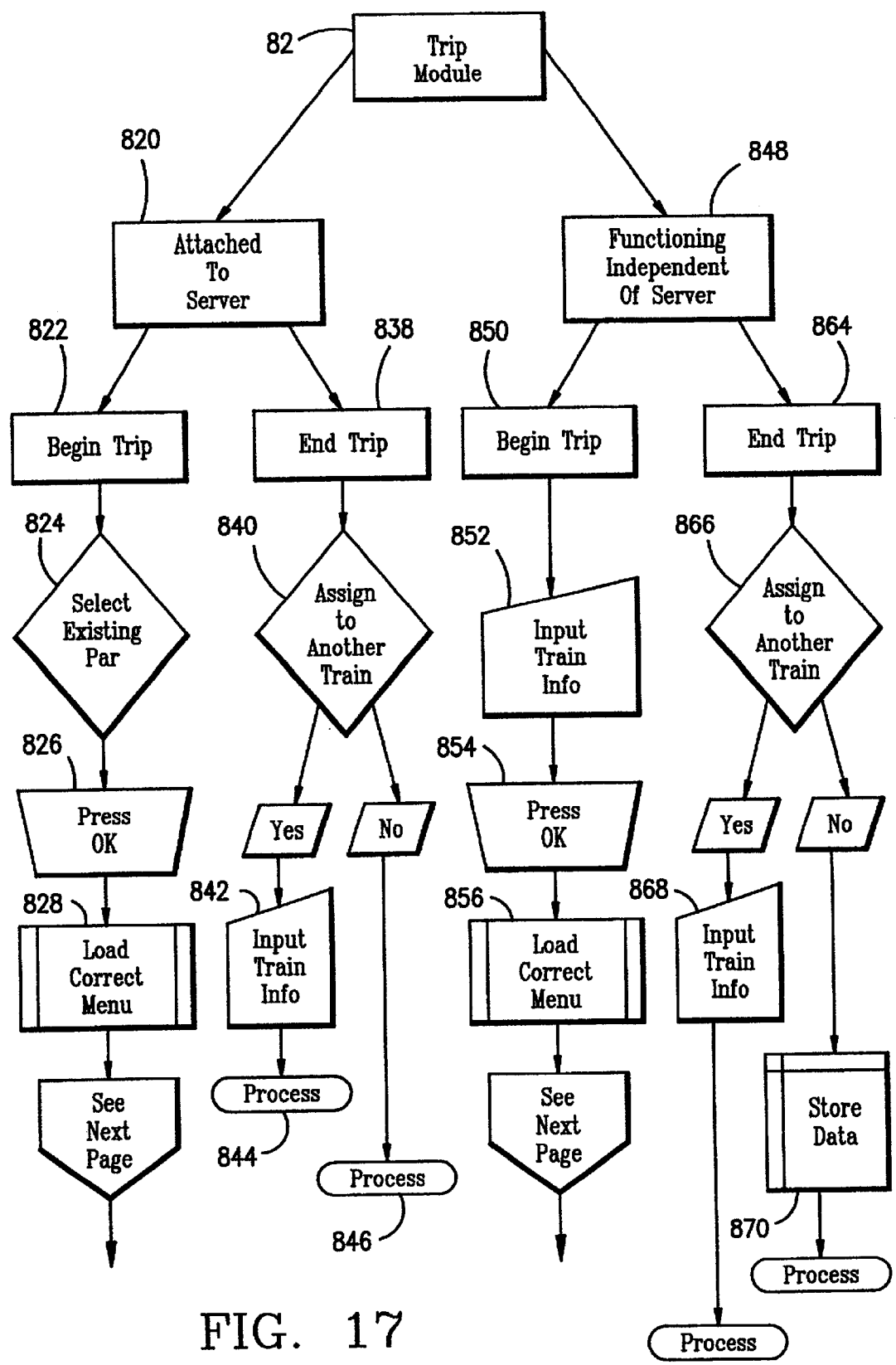
FIGS. 17–19 in combination form a flow chart illustrating the trip module of the instant invention.
Figures 18, 19:
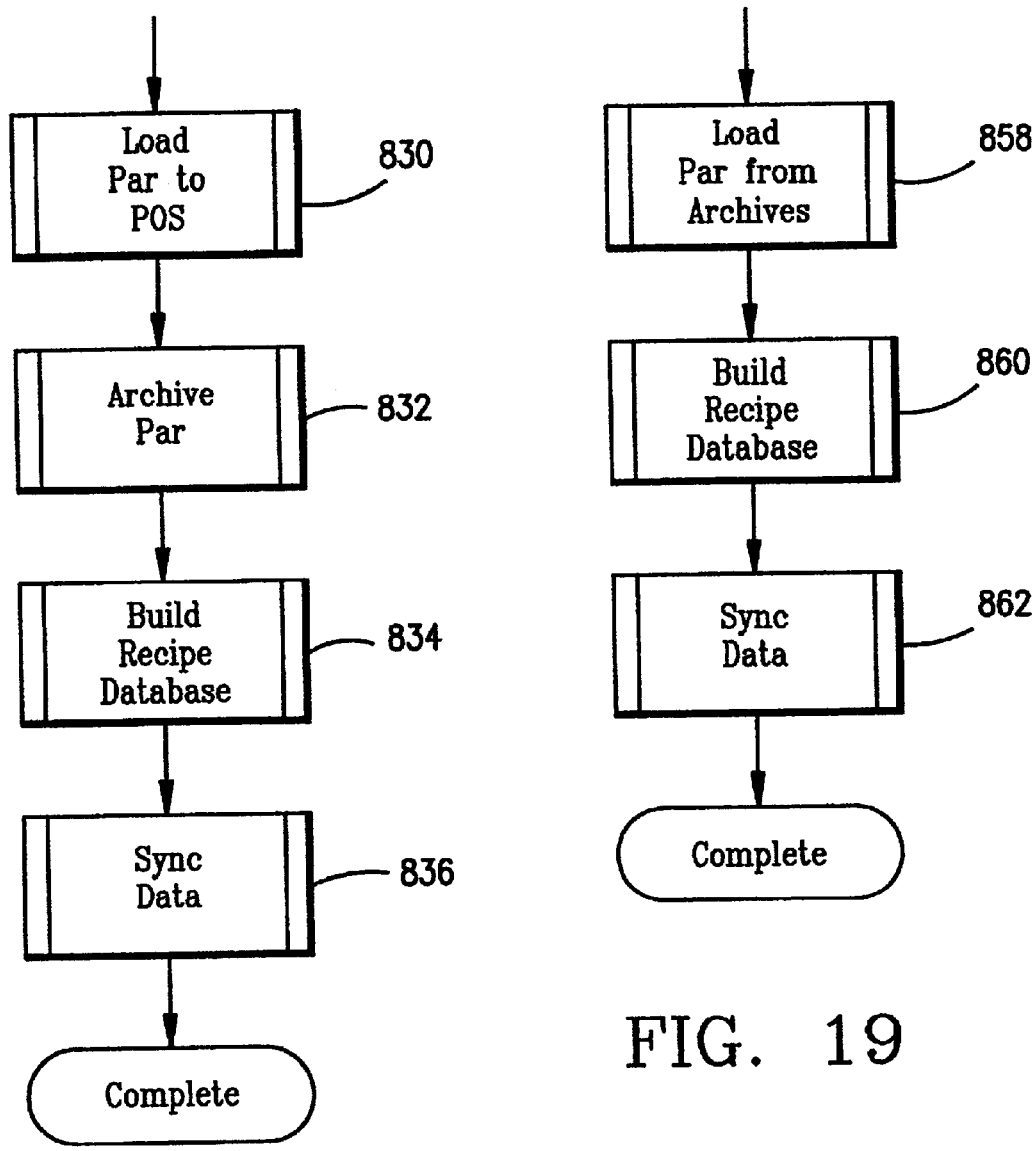

The trip module 60 as illustrated in FIG. 5 is further elaborated per the flow chart of the trip module 82 shown in FIGS. 17, 18 and 19. Trip module 82 is required to be resident in a POS unit to enable a service agent to download a predefined inventory from a local server onto her POS unit at the beginning of the trip. Moreover, the trip module enables the service agent to upload her sales, the ending inventory, credit card verification, and other information to the local server at the end of the trip. Other additional processes which the trip module enables include the ability of the service agent to change the train number for the trip during the trip, as for example when a train breaks down and is replaced by another train, with the service agent remaining on the replacement train. Thus, the capability to retain the trip data when there is a peer to peer transfer of stock of the inventory is provided by the trip module. So, too, the trip module provides the service agent the ability to select the correct inventory to download based on the train number, the car type and the car number.

With reference to FIG. 17, trip module 82 is shown to have two process paths, namely one when the POS unit is connected to the upload/download workstation or server, and another path when the POS unit functions independently, as when it is docked to a particular car on a train that is traveling along a given route.

Starting with the POS unit being attached to the server per process step 820. If it is at the beginning of the trip, per process step 822, the existing PAR file is selected per process step 824. Once the PAR file is selected, it is acknowledged by the pressing of an okay button, per process step 826. The correct menu is loaded per process step 828. Thereafter, the PAR file is loaded to the POS unit per process step 830. The PAR file is then archived per process step 832. A recipe database relating to the inventory is built per process step 834. The inventory data is then synchronized with the data in the POS unit per process step 836 to complete the downloading of information from the workstation. At the end of the trip as indicted by process step 838, if the service agent, and therefore the POS unit assigned to her, is assigned to another train, per step 840, the new train information is input per process step 842. Thereafter, processing of the input information on the new train proceeds with process step 844. On the other hand, if the service agent is not assigned to another train in process step 840, the processing of the data, i.e., uploading of the data to the workstation is processed per process step 846.

If the POS unit is functioning independent of any workstation, i.e., docked to a particular car of a train per process step 848, with the beginning of the trip as indicted per process step 850, the train information is input to the POS unit per process step 852. Once the train information is input and a okay button pressed per process step 854, the correct menu is loaded onto the POS unit screen per process step 856. Thereafter, the PAR file is loaded from the archives of the POS system per process step 858. A recipe database is built for the items that are shown on the menu per process step 860. The inventory data is then synchronized with the data in the POS unit per process step 862 to complete the process. At the end of the trip as indicated by process step 864, a determination is made on whether the POS unit, and the service agent to whom the POS unit is assigned, are to be assigned to another train per process step 866. If yes, the new train information is input per process step 868. Before any processing takes place. If not, the data is stored per processing step 870 before the processing takes place.

Figure 20:
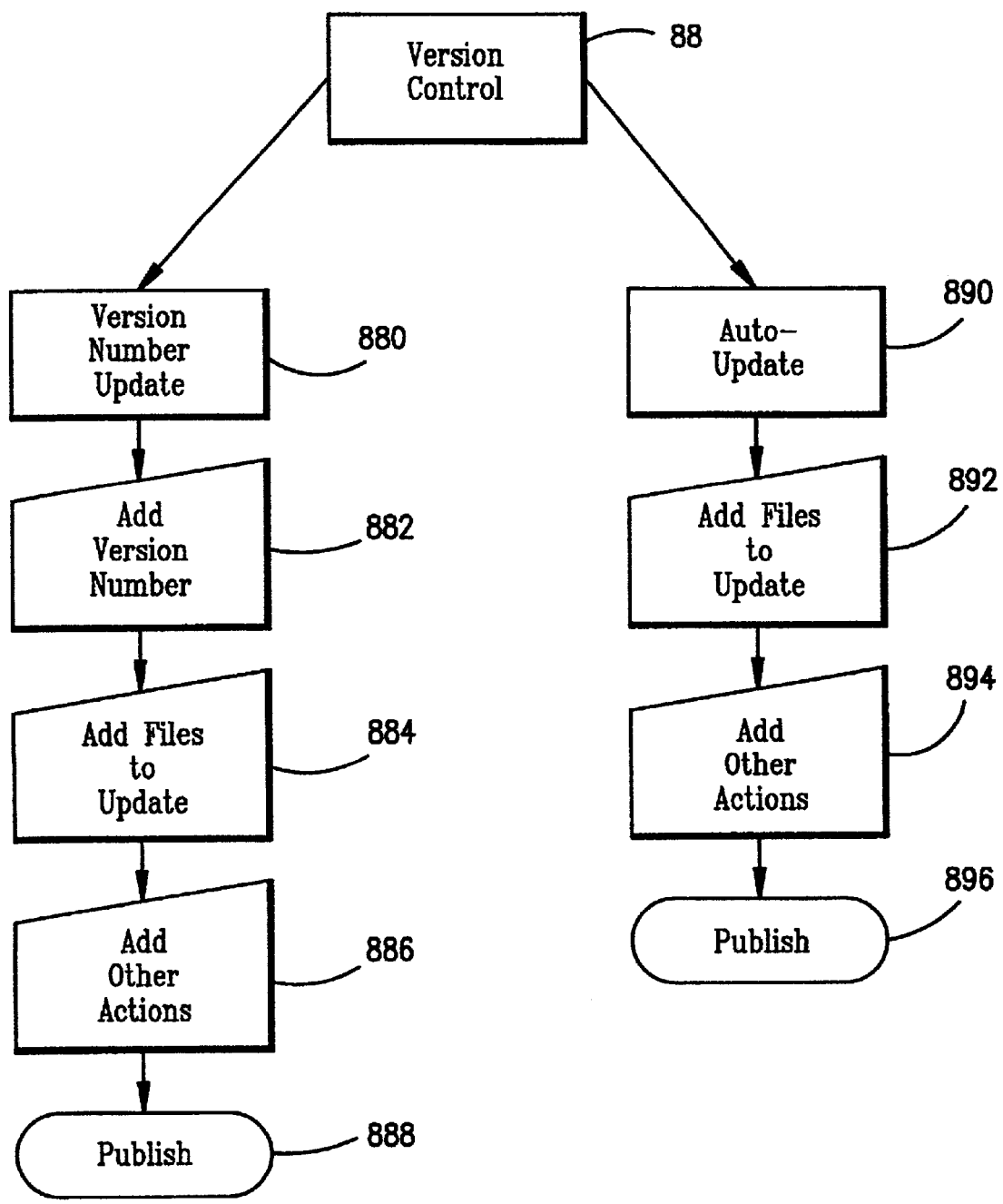
FIG. 20 is a flow chart illustrating the version control module of the instant invention.

Another module that is resident in each POS unit is the version control module as shown in FIG. 20. The purpose of the version control module 88 is to provide a capability for the POS unit to conduct periodic incremental updates. Thus, the version control module allows for determination of the status of the current version of the operating system of the POS unit, when the POS unit is attached to the network. Any applicable new version is updated to the POS unit automatically. The updating of new versions to a POS unit is done automatically every time the POS unit is connected to the network, and is transparent to the user. By updating each POS unit as that POS unit is connected to the network ensures that each POS unit in use has the latest operational system.

As shown in the flow diagram of FIG. 20, the version control module first scans the version number to determine the latest version number updated per process step 880. If a new version of the operation system is available, that version number is added per process step 882. New files are added or the existing files updated per process step 884. Any additional actions that are required to update the POS unit to the latest operating system takes place in process step 886. The version that has been updated is published per process step 888. As was mentioned previously, the version control module provides for the automatic updating of information and data files per process step 890. Files relating to the updated version are added or updated per process step 892. Any additional actions that need to be taken are done in process step 894. Again, the automatically updated version is printed out per process step 896.

Figure 21:
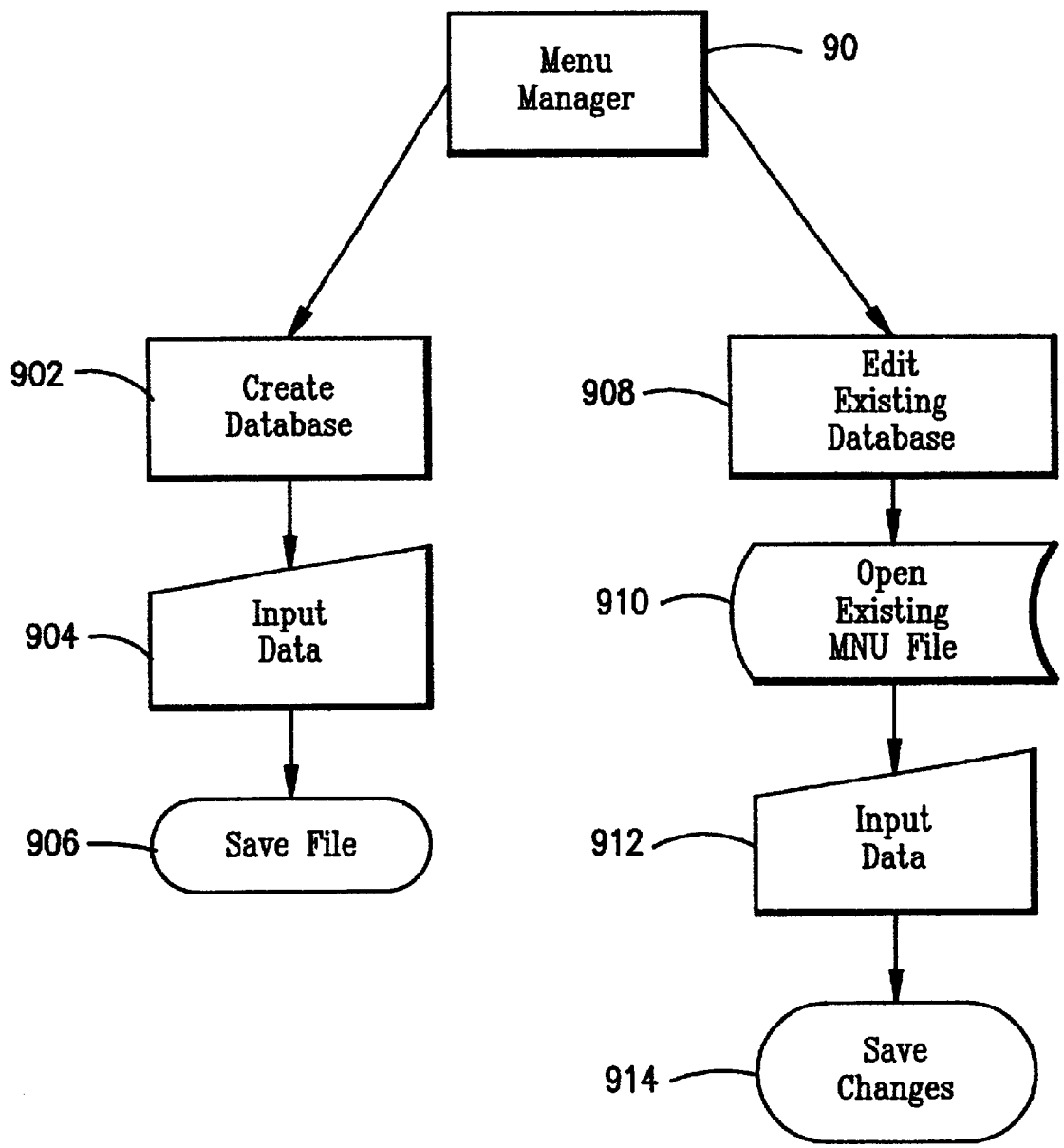
FIG. 21 is a flow chart illustrating the menu manager module of the instant invention.

Menu manager module 90 is shown in FIG. 21. The purpose of the menu manage program is to allow the management of the railroad network to manage multiple and varied menus. The menu manager program therefore is capable of being used to create and maintain the data files necessary for the trip module so as to determine which menu set to use with which train number, car type and car number, etc. Thus, as illustrated in FIG. 21, the menu manager module begins with the processing step 902 for creating a database. Data is input to the database per processing step 904. The database file is then saved per processing step 906. If there is an existing database, it is edited per processing step 908 by having the file open per process step 910. New data is input to the existing database per processing step 912. The thus edited database file is saved per processing step 914. With the menu manager module, different menus may be provided for different types of trains for different routes. For example, menu A may be provided for the lounge car of the "Sunset Limited" train, while menu B may be provided to the diner car of the same "Sunset Limited" train. Similarly, other menus may be provided for trains making different routes such as for example the route between Washington, D.C. and Chicago.

To satisfy the government requirement that the temperature of perishable foodstuffs be constantly monitored while the train travels along a given route, a temperature monitoring report program (not shown in any of the figures) is provided to record the temperature information that is taken from the refrigerator/freezer wherein the various foodstuffs are stored, and the served food temperatures. The thus measured temperatures are recorded and kept track of to ensure that the federal regulations are complied with. A set of database tables are provided in the POS unit to record the various temperatures that are monitored and measured. The thus recorded measured temperatures are subsequently reported to the management, when the POS unit is connected to a workstation.

Inasmuch as the present invention is subject to many variations, modifications and changes in detail, it is intended that all matter described throughout this specification and shown in the accompanying drawings be interpreted as illustrative only and not in a limiting sense. For example, although a railroad network is discussed hereinabove, it should be appreciated that a transport network that is made up of a fleet of buses, or other vehicles, would also be covered by the instant invention if foodstuffs are stored and served at the buses, and the data relating to the foodstuffs could be uploaded/downloaded at the various bus terminals. Accordingly, it is intended that the invention be limited only by the spirit and scope of the hereto appended claims.

What is claimed is:

1. A method of keeping tabs on the usage of inventory on a transport making a trip between at least two locations, comprising the steps of:
   a) stocking a given amount of inventory onto said transport at the start of said trip;
   b) downloading data relating to said given amount of inventory to a portable processor terminal from one of a plurality of data processor terminals;
   c) docking said portable terminal onto said transport;
   d) updating the data in said portable terminal to reflect the remaining amount of stocked inventory or the amount of stocked inventory used or sold, or becoming not usable on said transport, as the inventory gets depleted during said trip; and
   e) uploading data reflecting the amount of stocked inventory left on said transport and/or used or becoming not usable from said portable terminal to said one or an other of said plurality of data processor terminals at the end of said trip.

2. Method of claim 1, further comprising the steps of:
   sending the data relating to said given amount of inventory downloaded to said portable terminal to a host processor whereat a record of the inventory stocked onto said transport is maintained;
   sending the data reflecting the amount of stocked inventory not used on said transport uploaded to the data processor terminal from said portable terminal at the end of said trip to said host processor so that an overall record of the amount of inventory available for use is updated.

3. Method of claim 1, further comprising the steps of:
   communicatively connecting said portable terminal with at least an other portable processor terminal at said transport so that data relating to the amount of available inventory on said transport may be updated from either of said portable terminals;
   transmitting data received from either one of said portable terminals to other of said portable terminals so that the same data is maintained in both said portable terminals.

4. Method of claim 1, further comprising the step of:
   providing a remote access program in said portable terminal so that said portable terminal may be accessed remotely.

5. Method of claim 1, further comprising the steps of:
   removing the left over stocked inventory from said transport;
   storing the left over inventory in a commissar or transferring the left over inventory to an other transport.

6. Method of claim 1, wherein said inventory includes a plurality of salable items, and wherein said step (d) further comprises the step of:
   updating recipe for each of said items when a sale is made for said each item.

7. A method of keeping tabs of overall inventory used on multiple transports traveling throughout a transportation network interconnected by a plurality of stations, said multiple transports making different trips among various routes interconnecting said stations, comprising the steps of:
   a) providing at least one data processor terminal at each of said plurality of stations;
   b) communicatively connecting the data processor terminal at each station to a host processor;
   c) communicatively coupling each portable terminal for each selected transport stocked with a given amount of inventory to a data processor terminal at the station where said each selected transport is to begin its trip for downloading from said data processor terminal data relating to the amount of stocked inventory for said each selected transport;
   d) docking said each portable terminal to said selected transport;
   e) updating to said each portable terminal the amount of inventory on said selected transport as the amount of inventory is being depleted during the trip for said selected transport;

f) undocking said each portable terminal from said selected transport at the end of the trip;

g) communicatively coupling said each portable terminal to any one of the data processor terminals at the station where said selected transport ends its trip for uploading to said one data processor terminal data that relates to the amount of stocked inventory left and/or used or no longer usable on said selected transport; and h) transmitting the received inventory data to said host processor from said one data processor terminal so that said host processor may maintain an accurate accounting of the overall inventory for said transportation network.

8. Method of claim 7, wherein said step (d) further comprises the steps of:

communicatively connecting said each portable terminal at said selected transport with at least an other portable processor terminal at said selected transport to enable data relating to the amount of available inventory on said transport to be updated from either of said portable terminals;

transmitting data received from either one of said portable terminals to other of said portable terminals so that the same data is maintained in both said portable terminals.

9. Method of claim 7, wherein said inventory includes a plurality of salable items, and wherein said step (e) further comprises the step of:

updating recipe for each of said items when a sale is made for said each item.

10. System for keeping tabs on the usage of inventory on a transport making a trip between at least two locations, comprising:

a plurality of data processor terminals dispersed among different locations where said transport can reach;

a host processor to which said plurality of data processor terminals are communicatively connected;

a portable terminal assigned to a service agent working on said transport, data relating to a given amount of inventory stocked onto said transport at the start of said trip being downloaded to said portable terminal from one of a plurality of data processor terminals located at the start location for said trip, said portable terminal being docked to said transport during said trip;

wherein the data in said portable terminal reflecting the amount of stocked inventory on said transport is updated as the inventory on said transport gets depleted during said trip; and wherein data reflecting the amount of stocked inventory left on said transport and/or used or becoming not usable is uploaded from said portable terminal to one of the plurality of data processor terminals provided at the end location of said trip for routing to said host processor.

11. System of claim 10, wherein said portable terminal comprises a number of software modules each providing a particular function for said portable terminal.

12. System of claim 11, wherein said modules comprise at least one of the following:

a control panel module for provisioning said portable terminal with access to various automation functions while said portable terminal is docked to said transport;

a menu management module to enable the management of the system to manage and vary the menus of the items of the inventory to be sold on said transport;

an inventory module to keep track of the inventory from the time the inventory is loaded onto said transport from a commissary until the time the inventory is sold or becomes unusable during the trip, returned to either said commissary or an other commissary, or transferred to an other service agent;

a security management module to maintain the security for said portable terminal; and an employee assignment module to enable the service agent of said portable terminal or a manager of said transport to add an additional user with access to said portable terminal.

13. System of claim 10, wherein said portable terminal is equipped with a transceiver means to enable it to remotely communicate with either an other portable terminal or any one of said plurality of data processor terminals.

14. System of claim 10, wherein each of said plurality of data processor terminals, upon receipt of data uploaded thereto from a portable terminal, transmits the data to said host processor so that an overall view of the inventory for all transports at the various locations is maintained.

15. System of claim 10, wherein said transport is a train and wherein said different locations among where the data processor terminals are dispersed each being a train station.

16. System of claim 10, wherein said portable terminal comprises a point of sale cash register.

17. System of claim 10, further comprising:

a commissary located at at least one of said locations where inventory for stocking said transport is stored.

18. An inventory control system for a transportation company having multiple transports making different trips among various routes, comprising:

a host processor;

a plurality of data processor terminals each communicatively connected to said host processor;

a plurality of portable terminals each assigned to a particular service agent working on a selected transport stocked with a given amount of inventory, said each portable terminal being docked to its corresponding selected transport;

wherein each of said portable terminals is communicatively coupled to any one of said data processor terminals at the beginning of the trip for downloading from said one data processor terminal data relating to the given amount of inventory stocked on its corresponding selected transport, the given amount of available and/or not available inventory on the corresponding selected transport being updated to said each portable terminal as the inventory is depleted during the trip;

wherein at the end of the trip by each of the transports, the portable terminal on said each transport is undocked from said each transport and communicatively coupled to any selected one of said data processor terminals for uploading thereto data that relates to the amount of stocked inventory left and/or used or no longer usable on said each transport; and wherein, after receipt of uploaded inventory data from any of said portable terminals, said each data processor terminal transmits the received inventory data to said host processor so that said host processor may maintain an accurate accounting of the amount of inventory for the company.

19. System of claim 18, wherein each of said portable terminals is adaptable to communicatively connect to an other portable terminal on the same transport so that both portable terminals may be used to update the status of the inventory stocked on said transport.

20. System of claim 18, wherein said multiple transports each being a train.

21. System of claim 18, further comprising a plurality of train stations each having installed thereat at least one of said data processor terminals.

22. System of claim 18, wherin each of said portable terminals comprises a point of sale cash register; and
    wherein each of said data processor terminals comprises a work station.

23. System of claim 18, wherein said plurality of terminals each are equipped with a transceiver means to enable said each portable terminal to remotely communicate with any one of said data processor terminals or an other portable terminal.

* * * * *